(12) United States Patent
Ma et al.

(10) Patent No.: US 7,536,002 B1
(45) Date of Patent: May 19, 2009

(54) SYSTEM AND METHOD OF INTELLIGENT CALL ROUTING FOR CROSS SELL OFFER SELECTION BASED ON OPTIMIZATION PARAMETERS OR ACCOUNT-LEVEL DATA

(75) Inventors: Lizhi Ma, Newark, DE (US); Shane P. Pederson, Oak Park, IL (US); Wilson Khaemba, Newark, DE (US); Hui Wang, Bear, DE (US); Guru Kurubarahalli, Wilmington, DE (US); Gary Ulrich, West Trenton, NJ (US); Nitin Dhir, Wilmington, DE (US); Djovana Shkreli, Westerville, OH (US)

(73) Assignee: JPMorgan Chase Bank, National Association, New York, NY (US)

( * ) Notice: Subject to any disclaimer, the term of this patent is extended or adjusted under 35 U.S.C. 154(b) by 1009 days.

(21) Appl. No.: 10/799,712

(22) Filed: Mar. 15, 2004

Related U.S. Application Data

(63) Continuation-in-part of application No. 10/286,767, filed on Nov. 4, 2002, now Pat. No. 6,714,642, which is a continuation of application No. 09/349,960, filed on Jul. 9, 1999, now Pat. No. 6,553,113.

(51) Int. Cl.
 *H04M 3/00* (2006.01)
 *H04M 5/00* (2006.01)
(52) U.S. Cl. .................. 379/266.02; 379/265.02; 379/265.13
(58) Field of Classification Search ............. 379/265.02
 See application file for complete search history.

(56) References Cited

U.S. PATENT DOCUMENTS

| | | | |
|---|---|---|---|
| 4,649,563 A | 3/1987 | Riskin | |
| 4,694,397 A | 9/1987 | Grant et al. | |
| 4,694,483 A | 9/1987 | Cheung | |
| 4,722,054 A | 1/1988 | Yorozu et al. | |

(Continued)

OTHER PUBLICATIONS

Intelligent CallRouter, Delivering the Right Information to the Right Resource For Every Customer Interaction, 1 page.

(Continued)

*Primary Examiner*—Ahmad F Matar
*Assistant Examiner*—Khai N Nguyen
(74) *Attorney, Agent, or Firm*—Goodwin Procter LLP

(57) ABSTRACT

An apparatus and methods for a call routing system is disclosed whereby the call routing service provider is associated with a series of partners. By providing a system supporting not only the main user, but also the partners, efficiencies are gained through cost-spreading. Agents can be qualified to field calls for multiple business entities. Cross-selling and proactive servicing based on caller demographic and profile data can be effectuated. The system employs a centralized or global bank of shared Interactive Voice Response (IVR) units so that unnecessary post-routing and call site interflow are reduced. The system comprises a central server system that interfaces with a long distance provider so that route requests are received, caller data is retrieved from one or more databases, routing and handling strategies are developed, load balancing is effectuated, and calls are appropriately routed to one of a plurality of geographically separated call center systems with queues staffed by agents. Each call center system is designed to support various queues, and agents may be qualified or assigned to various queues based on their skill sets and skill levels.

27 Claims, 15 Drawing Sheets

U.S. PATENT DOCUMENTS

| | | |
|---|---|---|
| 4,745,468 A | 5/1988 | Von Kohorn |
| 4,774,664 A | 9/1988 | Campbell et al. |
| 4,792,968 A | 12/1988 | Katz |
| 4,797,911 A | 1/1989 | Szlam et al. |
| 4,845,739 A | 7/1989 | Katz |
| 4,914,587 A | 4/1990 | Clouse |
| 4,926,255 A | 5/1990 | Von Kohorn |
| 4,930,150 A | 5/1990 | Katz |
| 4,932,046 A | 6/1990 | Katz et al. |
| 4,939,773 A | 7/1990 | Katz |
| 4,975,945 A | 12/1990 | Carbullido |
| 4,987,590 A | 1/1991 | Katz |
| 5,014,298 A | 5/1991 | Katz |
| 5,073,929 A | 12/1991 | Katz |
| 5,091,933 A | 2/1992 | Katz |
| 5,121,945 A | 6/1992 | Thomson et al. |
| 5,128,984 A | 7/1992 | Katz |
| 5,164,981 A | 11/1992 | Mitchell et al. |
| 5,179,584 A | 1/1993 | Tsumura |
| 5,181,238 A | 1/1993 | Medamana et al. |
| 5,185,787 A | 2/1993 | Katz |
| 5,206,903 A | 4/1993 | Kohler et al. |
| 5,212,789 A | 5/1993 | Rago |
| 5,224,153 A | 6/1993 | Katz |
| 5,231,571 A | 7/1993 | D'Agostino |
| 5,251,252 A | 10/1993 | Katz |
| 5,255,309 A | 10/1993 | Katz |
| 5,259,023 A | 11/1993 | Katz |
| 5,278,898 A | 1/1994 | Cambray et al. |
| 5,297,197 A | 3/1994 | Katz |
| 5,309,505 A | 5/1994 | Szlam et al. |
| 5,309,513 A | 5/1994 | Rose |
| 5,351,285 A | 9/1994 | Katz |
| 5,359,645 A | 10/1994 | Katz |
| 5,383,113 A | 1/1995 | Kight et al. |
| 5,396,542 A | 3/1995 | Alger et al. |
| 5,414,754 A | 5/1995 | Pugh |
| 5,436,965 A | 7/1995 | Grossman et al. |
| 5,442,688 A | 8/1995 | Katz |
| 5,444,774 A | 8/1995 | Friedes |
| 5,450,479 A | 9/1995 | Alesio et al. |
| 5,452,350 A | 9/1995 | Reynolds |
| 5,465,290 A | 11/1995 | Hampton et al. |
| 5,467,391 A | 11/1995 | Donaghue, Jr. et al. |
| 5,495,284 A | 2/1996 | Katz |
| 5,511,112 A | 4/1996 | Szlam |
| 5,515,428 A | 5/1996 | Sestak et al. |
| 5,517,566 A | 5/1996 | Smith et al. |
| 5,519,772 A | 5/1996 | Akman et al. |
| 5,530,744 A | 6/1996 | Charalambous |
| 5,546,452 A | 8/1996 | Andrews et al. |
| 5,555,299 A | 9/1996 | Maloney et al. |
| 5,559,855 A | 9/1996 | Dowens et al. |
| 5,561,707 A | 10/1996 | Katz |
| 5,561,711 A | 10/1996 | Muller |
| 5,594,791 A | 1/1997 | Szlam et al. |
| 5,608,785 A | 3/1997 | Kasday |
| 5,608,789 A | 3/1997 | Fisher et al. |
| 5,615,341 A | 3/1997 | Agrawal et al. |
| 5,675,607 A | 10/1997 | Alesio et al. |
| 5,684,863 A | 11/1997 | Katz |
| 5,715,450 A | 2/1998 | Ambrose et al. |
| 5,742,675 A | 4/1998 | Kilander et al. |
| 5,742,775 A | 4/1998 | King |
| 5,745,706 A | 4/1998 | Wolfberg et al. |
| 5,757,904 A | 5/1998 | Anderson |
| 5,758,126 A | 5/1998 | Daniels et al. |
| 5,761,288 A | 6/1998 | Pinard et al. |
| 5,765,142 A | 6/1998 | Allred et al. |
| 5,784,452 A | 7/1998 | Carney |
| 5,787,154 A | 7/1998 | Hazra et al. |
| 5,793,846 A | 8/1998 | Katz |
| 5,815,551 A | 9/1998 | Katz |
| 5,825,856 A | 10/1998 | Porter et al. |
| 5,825,870 A | 10/1998 | Miloslavsky |
| 5,828,734 A | 10/1998 | Katz |
| 5,832,447 A | 11/1998 | Rieker et al. |
| 5,835,087 A | 11/1998 | Herz et al. |
| 5,848,143 A | 12/1998 | Andrews et al. |
| 5,878,130 A | 3/1999 | Andrews et al. |
| 5,898,762 A | 4/1999 | Katz |
| 5,917,893 A | 6/1999 | Katz |
| 5,923,745 A | 7/1999 | Hurd |
| 5,953,406 A | 9/1999 | LaRue et al. |
| 5,974,120 A | 10/1999 | Katz |
| 6,016,344 A | 1/2000 | Katz |
| 6,038,552 A | 3/2000 | Fleischl et al. |
| 6,049,811 A | 4/2000 | Petruzzi et al. |
| 6,052,460 A | 4/2000 | Fisher |
| 6,064,973 A | 5/2000 | Smith |
| 6,098,052 A | 8/2000 | Kosiba et al. |
| 6,100,891 A | 8/2000 | Thorne |
| 6,101,486 A | 8/2000 | Roberts et al. |
| 6,134,315 A | 10/2000 | Galvin |
| 6,175,563 B1 | 1/2001 | Miloslavsky |
| 6,212,178 B1 | 4/2001 | Beck et al. |
| 6,215,783 B1 | 4/2001 | Neyman |
| 6,230,287 B1 | 5/2001 | Pinard et al. |
| 6,233,332 B1 | 5/2001 | Anderson et al. |
| 6,301,351 B1 | 10/2001 | King |
| 6,301,567 B1 | 10/2001 | Leong et al. |
| 6,304,653 B1 | 10/2001 | O'Neil et al. |
| 6,311,231 B1 | 10/2001 | Bateman et al. |
| 6,327,359 B1 | 12/2001 | Kang et al. |
| 6,330,327 B1 | 12/2001 | Lee et al. |
| 6,389,400 B1 * | 5/2002 | Bushey et al. .................. 705/7 |
| 6,513,018 B1 | 1/2003 | Culhane |
| 6,597,775 B2 | 7/2003 | Lawyer et al. |
| 2001/0047489 A1 | 11/2001 | Ito et al. |
| 2002/0016769 A1 | 2/2002 | Barbara et al. |
| 2002/0023055 A1 | 2/2002 | Antognini |
| 2002/0029154 A1 | 3/2002 | Majoor |
| 2002/0049691 A1 | 4/2002 | Majoor |
| 2002/0059141 A1 | 5/2002 | Davies et al. |
| 2002/0194117 A1 * | 12/2002 | Nabe et al. .................... 705/38 |
| 2003/0215083 A1 * | 11/2003 | McPartlan et al. ..... 379/265.02 |

OTHER PUBLICATIONS

Computer Telephony Solutions, The Customer Interaction Specialists, printed May 25, 1999, 1 page.
VocalTec Ltd., VocalTec Telephony Gateway, Product Brochure, 8 pages, 1993-1996.
Telephony, printed May 25, 1999, 1 page.
VocalTec Ltd., Telephony Gateway, Product Overview, VocalTec's Telephony Gateway Product Component Description and Functional Specifications, 9 pages, 1993-1996.
Computer Telephony Solutions—Telemarketing, The Customer Interaction Specialists, Telemarketing & Customer Support Outsourcing, printed May 25, 1999, 2 pages.
Computer Telephony Solutions—Internet Telephony, The Customer Interaction Specialists, Internet Telephony, printed May 25, 1999, 1 page.
Kelly Mahoney, Customer base management: Leverage telemarketing and call center environment, Direct Marketing, vol. 95, No. 6, pp. 20, 67, Oct. 1996 (Abstract—3 pages).
CSU/DSU (Channel Service Unit/Data Service Unit), pp. 208-210.
Computer Telephony Solutions—Computer Telephony, The Customer Interaction Specialists, Computer Telephony Systems, printed May 25, 1999, 3 pages.
Computer Telephony Solutions—CallWeb Centres, The Customer Interaction Specialist, Call and Web Centres, printed May 25, 1999, 5 pages.

Intelligent CallRouter, Delivering the Right Information to the Right Resource For Every Customer Interaction, 1 page, no date.

CSU/DSU (Channel Service Unit/Data Service Unit), pp. 208-210, no date.

"Innovative Call Center Solutions" sales brochure materials (undated) by Center Force Technologies distributed at Nov. 1999 conference (21) pages.

Rule 132 Declaration by Inventor Djovana Shkreli dated Jan. 6, 2000, 2 pages.

Rule 132 Declaration by Inventor Thorp Foster dated Jan. 10, 2000, 2 pages.

* cited by examiner

| From List Management | | | | | Scores | | | | | | Profit Measures | | | | | | Objective Function | | | | | | Output | | |
|---|---|---|---|---|---|---|---|---|---|---|---|---|---|---|---|---|---|---|---|---|---|---|---|---|---|
| | Eligibility | | | Behavioral Segment | Call Probability | Response Scores | | | | | NPV values | | | | | | ENPV | | | | | | | | |
| Account # | FP | HE | PVG | | | FP | HE | PVG | | | FP | HE | PVG | | | FP | HE | PVG | | | | FP | HE | PVG |
| xxxx5046 | 1 | 0 | 1 | BLEND | 34.32% | 4.37% | 8.17% | 23.85% | | | 105.83 | 51.18 | 26.76 | | | 1.586 | 0.000 | 2.190 | | | | 1 | 0 | 2 |
| xxxx1657 | 0 | 1 | 1 | BLEND | 35.46% | 7.25% | 7.44% | 23.48% | | | 105.83 | 51.18 | 26.76 | | | 0.000 | 1.351 | 2.228 | | | | 0 | 2 | 1 |
| xxxx7459 | 0 | 1 | 1 | BLEND | 32.51% | 4.29% | 7.35% | 23.48% | | | 105.83 | 51.18 | 26.76 | | | 0.000 | 1.222 | 2.043 | | | | 0 | 2 | 1 |
| xxxx0080 | 0 | 1 | 1 | BLEND | 22.94% | 2.89% | 10.92% | 34.58% | | | 105.83 | 51.18 | 26.76 | | | 0.000 | 1.281 | 2.122 | | | | 0 | 2 | 1 |
| xxxx1322 | 1 | 1 | 1 | EMOB | 44.77% | 2.24% | 20.10% | 5.14% | | | 32.36 | 148.72 | 8.43 | | | 0.324 | 13.381 | 0.194 | | | | 3 | 1 | 4 |
| xxxx5650 | 0 | 1 | 1 | BLEND | 31.30% | 7.98% | 7.36% | 26.56% | | | 105.83 | 51.18 | 26.76 | | | 0.000 | 1.179 | 2.225 | | | | 0 | 2 | 1 |
| xxxx6396 | 0 | 1 | 1 | BLEND | 27.74% | 4.67% | 9.92% | 27.55% | | | 105.83 | 51.18 | 26.76 | | | 1.370 | 1.408 | 2.045 | | | | 3 | 1 | 2 |
| xxxx4506 | 0 | 1 | 1 | BLEND | 35.43% | 1.93% | 14.84% | 21.56% | | | 105.83 | 51.18 | 26.76 | | | 0.000 | 2.692 | 2.045 | | | | 0 | 2 | 1 |
| xxxx9484 | 0 | 1 | 1 | BLEND | 27.41% | 5.56% | 10.20% | 29.75% | | | 105.83 | 51.18 | 26.76 | | | 0.000 | 1.431 | 2.182 | | | | 0 | 2 | 2 |
| xxxx4972 | 1 | 1 | 1 | BLEND | 37.96% | 2.81% | 22.16% | 20.05% | | | 105.83 | 51.18 | 26.76 | | | 1.130 | 4.306 | 2.037 | | | | 3 | 1 | 1 |
| xxxx4102 | 0 | 1 | 1 | BLEND | 28.90% | 8.52% | 10.82% | 25.94% | | | 105.83 | 51.18 | 26.76 | | | 0.000 | 1.601 | 2.006 | | | | 0 | 2 | 2 |
| xxxx5005 | 1 | 1 | 1 | EMOB | 45.30% | 3.29% | 19.40% | 8.60% | | | 32.36 | 148.72 | 8.43 | | | 0.482 | 13.070 | 0.328 | | | | 2 | 1 | 4 |
| xxxx2804 | 0 | 0 | 1 | BLEND | 28.20% | 3.55% | 8.13% | 28.99% | | | 105.83 | 51.18 | 26.76 | | | 0.000 | 0.000 | 2.187 | | | | 0 | 0 | 0 |
| xxxx8162 | 0 | 1 | 1 | BLEND | 26.35% | 6.14% | 12.84% | 28.59% | | | 105.83 | 51.18 | 26.76 | | | 0.000 | 1.732 | 2.016 | | | | 0 | 2 | 1 |
| xxxx9159 | 1 | 1 | 1 | BLEND | 39.14% | 17.58% | 10.21% | 11.15% | | | 105.83 | 51.18 | 26.76 | | | 7.285 | 2.046 | 1.168 | | | | 1 | 2 | 3 |
| xxxx4480 | 0 | 1 | 1 | BLEND | 34.92% | 2.94% | 11.48% | 23.13% | | | 105.83 | 51.18 | 26.76 | | | 0.000 | 2.051 | 2.161 | | | | 0 | 2 | 1 |
| xxxx1804 | 1 | 0 | 1 | BLEND | 33.10% | 21.41% | 10.16% | 8.13% | | | 105.83 | 51.18 | 26.76 | | | 7.501 | 0.000 | 0.000 | | | | 1 | 0 | 0 |
| xxxx7227 | 1 | 1 | 1 | EMOB | 34.76% | 2.51% | 25.30% | 9.55% | | | 32.36 | 148.72 | 8.43 | | | 0.283 | 13.078 | 0.280 | | | | 2 | 1 | 3 |
| xxxx3574 | 1 | 1 | 1 | EMOB | 41.93% | 2.82% | 21.07% | 8.53% | | | 32.36 | 148.72 | 8.43 | | | 0.383 | 13.140 | 0.301 | | | | 2 | 1 | 4 |
| xxxx6964 | 0 | 1 | 1 | BLEND | 25.52% | 27.18% | 7.15% | 11.86% | | | 105.83 | 51.18 | 26.76 | | | 7.342 | 0.934 | 0.810 | | | | 1 | 2 | 3 |
| Total leads position 1 | | | | | | | | | | | | | | | | | | | | | | 4 | 6 | 9 |
| Min. lead constrains | | | | | | | | | | | | | | | | | | | | | | 6MM | 5MM | 4MM |

SYSTEM AND METHOD OF INTELLIGENT CALL ROUTING FOR CROSS SELL OFFER SELECTION BASED ON OPTIMIZATION PARAMETERS OR ACCOUNT-LEVEL DATA

RELATED APPLICATIONS

This application is a continuation-in-part of application Ser. No. 10/286,767 entitled "System and Method of Call Decisioning in a Virtual Call Center Integrating Telephony with Computers," filed on Nov. 4, 2002, which is a continuation of application Ser. No. 09/349,960, entitled "System and Methods for Call Decisioning in a Virtual Call Center Integrating Telephony with Computers," filed on Jul. 9, 1999 (now U.S. Pat. No. 6,553,113). The disclosures of both of the aforementioned applications (Ser. Nos. 10/286,767 and 09/349,960) are incorporated by reference herein in their entirety.

FIELD OF THE INVENTION

The present invention relates generally to a system and method for routing phone calls in a service center that integrates telephony with computers to provide a positive and personalized service environment that increases caller recognition, provides cross-selling benefits through proactive servicing, and spreads cost by supporting partners associated with the call center provider.

BACKGROUND OF THE INVENTION

It is increasingly common that consumers seek service from business concerns using the telephone. For example, a consumer seeking to place an order, schedule a delivery, file a complaint, or query an account balance may place a call to a centralized number provided by a business concern. It is well known that businesses often provide such numbers as so-called toll-free "800" numbers or the like.

Such toll free sites may be staffed by a series of agents who have been trained in customer service. While most agents will have generalized training and knowledge in dealing with customers, they typically have different levels of experience and training with regards to particular skill sets. For example, certain agents will have extensive experience with one type of product or transaction, while other agents will have experience with different products or transactions. Thus, agents may have different skill sets. Two agents may have familiarity with a given product or transaction, but may have a different level of skill for the given item. Thus, agents may have different skill levels for a given skill set.

Additionally, certain agents may have specialized skill sets not readily adapted to training, but still very important to certain customers. For example, some agents may have fluency in certain languages, such as Spanish or French.

Turning to the other side of the customer service interaction, each customer may need a different type of service or transaction and, moreover, each customer may have certain other non-transaction specific needs. For example, in the context of a credit card provider, one customer may seek to execute a balance transfer from one card account to another. A second customer may seek to increase his/her credit limit. Thus, these two customers have different service needs. Consequently, each may need to be routed to a service specialist with the appropriate skill set, i.e., to execute a balance transfer or to process a credit card limit increase.

Some toll free sites are so-called "virtual call centers," whereby calls are routed to agents at call centers at different geographic locations. These systems have significant drawbacks in their ability to properly route calls. Often a customer's particular needs are not fully ascertained until after a call has been routed to a call site. It is not uncommon that a call will have to be rerouted to a different site because a qualified agent does not exist or is occupied at that site. In the example given above, the customer seeking a limit increase may be routed to a first site that has no available agents with that skill set. The result is that the call routing system must "pull back" the call to reroute it to a second site. This ties up system resources (e.g., ports at a peripheral device at the first call site) and often results in customer dissatisfaction. This problem, referred to as "site interflow," is a significant drawback in conventional systems.

Having routed the call to a second site with an agent qualified to execute limit increases, the call routing system might then learn that this customer requires an agent with fluency in Spanish. The call routing system may learn this when the customer first talks with an agent. Or the customer may be first be routed to a "front-end" interactive voice response unit (IVR or VRU) at the call site. The customer may then enter digits in response to a menu asking whether the customer has special language requirements. In this example, the call routing system may now be required to route the customer to a third call site because the second site has no agent fluent in Spanish and also qualified to execute limit increases. Again, system resources are tied up and the customer may be further irritated by the delay in servicing the call.

In short, conventional systems' inability to route calls to the best agent on the "first pass" results in two significant drawbacks. First, system resources are used suboptimally, resulting in significant costs for call routing systems that may have to handle thousands of calls per hour. Second, customer satisfaction is not maximized, resulting in lost accounts and sales. In a modern economy where service is the hallmark of successful enterprises, this is a significant disadvantage.

Another disadvantage of conventional call routing systems is their cost. Implementing a virtual call center may require costly hardware and software in the form of a central routing controller server, interexchange (IXC) long distance interface, administrative work stations, various peripherals such as automatic call distributors (ACDs) and primary branch exchange units (PBXs), and hardware for the network interface such as for a Wide Area Network (WAN). There are also significant costs associated with the software necessary for interface with the IXC, load balancing, data management, and network interfacing (e.g., WAN system administration). There are also significant costs for the human capital required, i.e., the money required to train and pay agents and call routing system support personnel.

The high cost of implementing and operating conventional virtual call routing schemes is a significant disadvantage that may prevent smaller, undercapitalized business concerns from creating virtual call center services.

Other problems and drawbacks also exist.

According to Andrews, et. al., U.S. Pat. No. 5,546,452, a generalized call routing system is disclosed having a central controller distributing calls to agent systems based on real time status information and generalized load balancing considerations. However, the Andrews system does not solve the problems described above, nor does it achieve some of the objects and provide many the advantages of the invention described below.

SUMMARY OF THE INVENTION

For these and like reasons, what is desired is a system and method of providing a call routing system providing a virtual call center configured with centralized IVR's so that customer calls are more efficiently routed to qualified advisors without undue rerouting and queues within a call site.

Accordingly, it is one object of the present invention to overcome one or more of the aforementioned and other limitations of existing systems and methods for providing a virtual call center.

It is another object of the invention to provide a virtual call center with a virtual call center provider that is associated with a series of partners so that costs are reduced and hardware/software and human resources are shared.

It is another object of the invention to provide a virtual call center with strategic decisioning logic relying on customer behavior data or profile in order to route callers in a fashion that increases customer satisfaction and revenue.

It is another object of the invention to provide a virtual call center with proactive servicing, whereby database information and strategic decisioning logic is employed to predict other services and products of interest to a caller so that the call can be routed accordingly.

To achieve these and other objects of the present invention, and in accordance with the purpose of the invention, as embodied and broadly described, an input information to be gathered before call routing to call sites within the virtual call center network. Site interflow and post-routing requirements are reduced. The system employs decisioning logic based on customer behavior or profile data in order to provide routing strategies (where to send the call) and handling strategies (how should the agent handle the call once received). This strategic decisioning logic also generates routing strategies for so-called "proactive servicing," or routing based in part on predictions about other services or products of interest to a customer based on behavior or profile data.

The accompanying drawings are included to provide a further understanding of the invention and are incorporated in and constitute part of this specification, illustrate several embodiments of the invention and, together with the description, serve to explain the principles of the invention. It will become apparent from the drawings and detailed description that other objects, advantages and benefits of the invention also exist.

Additional features and advantages of the invention will be set forth in the description that follows, and in part will be apparent from the description, or may be learned by practice of the invention. The objects and other advantages of the invention will be realized and attained by the system and methods, particularly pointed out in the written description and claims hereof as well as the appended drawings.

BRIEF DESCRIPTION OF THE DRAWINGS

The purpose and advantages of the present invention will be apparent to those of skill in the art from the following detailed description in conjunction with the appended drawings in which like reference characters are used to indicate like elements, and in which:

FIG. 11 is a schematic diagram depicting a graphical user interface that includes a list of offer presentations generated according to an embodiment of the present invention.

FIG. 15 is a chart depicting routing list formation for a number of call-in customers according to an embodiment of the present invention.

DETAILED DESCRIPTION OF THE INVENTION

As discussed in the Summary of the Invention, the present invention is directed to a method and apparatus for a call routing system that reduces post-routing site interflow and that supports multiple partners and proactive servicing through strategic decisioning.

Strategic decisioning generally refers to the concept of establishing informed routing strategies based on some combination of customer-supplied data, DNIS/ANI data, and customer profile behavior data to improve caller satisfaction, reduce interflow and provide proactive servicing and cross-selling.

Overview of the System

Figure 1:
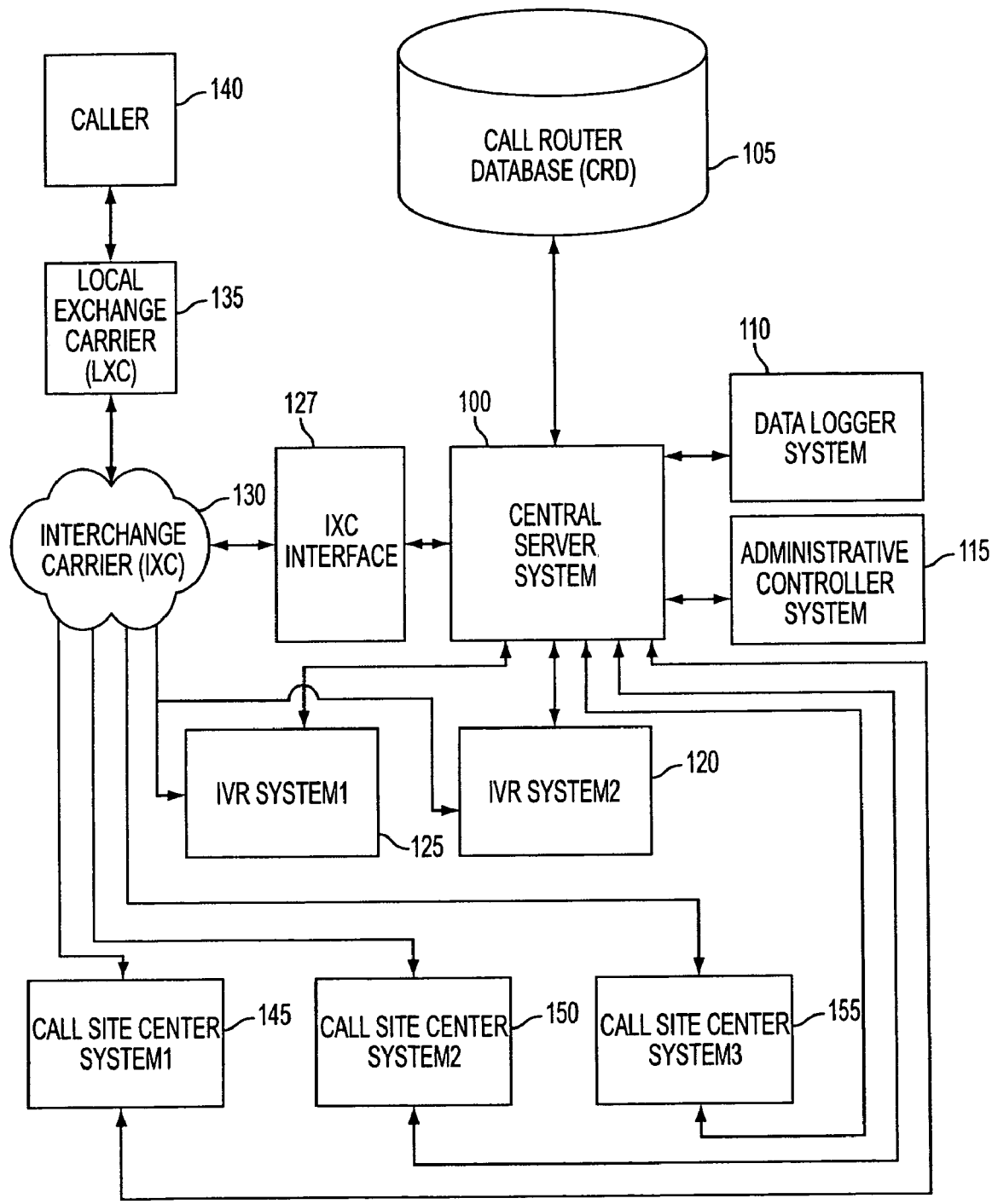
FIG. 1 is a block diagram of the call routing system according to an embodiment of the invention, including a central server system, IVR's, call site centers, data logger system, administrative controller system, database, IXC and IXC interface, local exchange and call originating site.

FIG. 1 depicts an overview of the system, according to an embodiment of the present invention, including central server system 100; data logger system 110; administrative controller system 115; call router database 105; IVR system1 125; IVR system2 120; call site center system1 145; call site center system2 150; call site center system3 155; IXC interface 127; interexchange carrier (IXC) 130; local exchange carrier 135; and caller 140.

Central server system 100 comprises a server system for centralized control over the call routing in the call routing system. Generally, central server system 100 includes hardware and software for supporting system administration, database management, carrier network interface, and transmission/reception of data to/from the central IVR's (blocks 120 and 125) and call site center systems (blocks 145-155). In general, central server system 100 receives routing requests from interexchange carrier (IXC) 130. Central server system 100 processes routing requests, as well as other information, to issue a return route address to IXC 130 to control where a call is routed. As will be discussed in greater detail below, sometimes the return route address causes a call to be forwarded to an IVR system (e.g., pre-routing to IVR system1 125 or IVR system2 120), and other times the call is forwarded to one of the call site center systems (e.g., post-routing call site center systems 1-3, modules 145-155).

In one embodiment, central server system 100 comprises an Intelligent CaltRouter™ (ICR) system marketed by Geo-Tel Communications for call routing to a plurality of peripherals at call centers. While not depicted in FIG. 1, one or more backup servers may be provided for purposes of redundancy to ameliorate or eliminate the effects of crashes, malfunctions and the like.

Regarding the communication between central server system 100 and the other system elements, the interface and protocol may comprise means familiar to those of skill in the art. The interface between system elements may be through direct connection or direct lines or may be over a network, such as the Internet, Wide Area Network (WAN), Local Area Network (LAN) or the like. In the preferred embodiment, call site center systems 1-3 (blocks 145-155) interface with central server 100 over a WAN. Regarding data format for non-voice data (such as real-time status information transmitted from peripherals to central server system 100), TCP/IP protocol is used, although departures therefrom remain within the spirit and scope of the invention.

Data logger system 110 comprises hardware and software for logging activity of the call routing system. For example, data logger system 110 may provide for the storage of records reflecting the path taken by every call entering the call routing system. Data logger 110 may store records reflecting activity levels of various peripherals, such as IVR's and call centers, so that system administration personnel can evaluate long term loading levels. Data logger system 110 may provide for storage of both short-term transactional data (see, e.g., FIG. 2, module 200) and long term historical data (see, e.g., FIG. 2, module 205).

Administrative controller system 115 may comprise a workstation or the like for administering and monitoring the call routing system. Administrative controller system 115 may be used to input new parameters or routing scripts to central server system 100. Administrative controller system 115 may be used to access data in order to generate reports reflecting activity on the call routing system, such as volume of calls, allocation of calls to various queues, rate of account recognition, site interflow rates and so forth.

Call router database (CRD) 105 comprises storage means for storing data for the call router system. CRD 105, discussed further below in connection with FIG. 2, may comprise any reliable storage technology, such as hard drives, CD-ROM, optical drives and so on. Generally, CRD 105 is accessed by central server system 100 in order to retrieve customer identification and profile or behavior data in order to generate routing strategies and return addresses. CRD 105 is also controlled by central server system 100 to store transaction and history data reflecting activity on the call routing system.

IVR system1 125 and IVR system2 120 collect information from callers (e.g., using touch-tone activated voice menus) in order to route calls to the proper target, such as to a qualified agent at a queue at a call site. In the preferred embodiment, calls are first forwarded (i.e., pre-routed) to one of said IVR systems. Callers can receive automated servicing and access to their accounts using the touch-tone controlled menus. Alternatively, callers seeking servicing by a live agent can "dial out" by entering "#" or the like. In that event, additional information can be received in order to recognize the proper account and provide the best return route address to IXC 130. In this embodiment, once the return route address (e.g., for post-routing) is determined by central server system 100, the call may be returned from the IVR to IXC 130 by using a technology such as so-called "take back and transfer" (TNT) technology supported by MCI Corp. Once the call is returned to IXC 130, it is routed to the proper target in accordance with the return route address. IVR system1 125 is discussed further in connection with FIG. 4.

Call site center systems 1-3 (blocks 145-155) comprise call sites for receiving calls forwarded by IXC 130. Generally, said call sites will comprise one or more so-called peripherals capable of receiving calls, such as local VRU's, PBX's (Private Branch Exchange), and ACD's (Automatic Call Distributors). Said call sites generally include agents and agent workstations for human-assisted call processing, further discussed in connection with FIG. 3.

IXC interface 127 represents hardware/software that may be required to convert data transmitted between IXC 130 and central server system 100. Long distance carriers may have data formats (e.g., for the route request and return address) that differ among long distance providers (e.g., MCI™ v. Sprint™) and that may require conversion into a format usable by central server system 100. Broadly speaking, IXC interface 127 represents the interface that permits the integration of computers and telephony (often referred to as CTI or computer telephony integration) for the call routing system.

IXC 130 represents the long distance carrier network that is controlled by central server system 100 to route calls to call sites and queues at the different geographic locations. While not depicted in FIG. 1, IXC 130 may further comprise a data access point (DAP) representing the point or node in the long distance switching network that receives return route address data to determine call destination.

Local exchange carrier (LXC) 135 represents that local phone network receiving a customer's call in a local area for forwarding to IXC 130. For example, a customer calling a toll-free 800 number is routed through his/her local phone network to the long distance network, IXC 130.

Caller 140 represents the caller originating a call that is routed through the call routing system.

The Call Router Database

Figure 2:
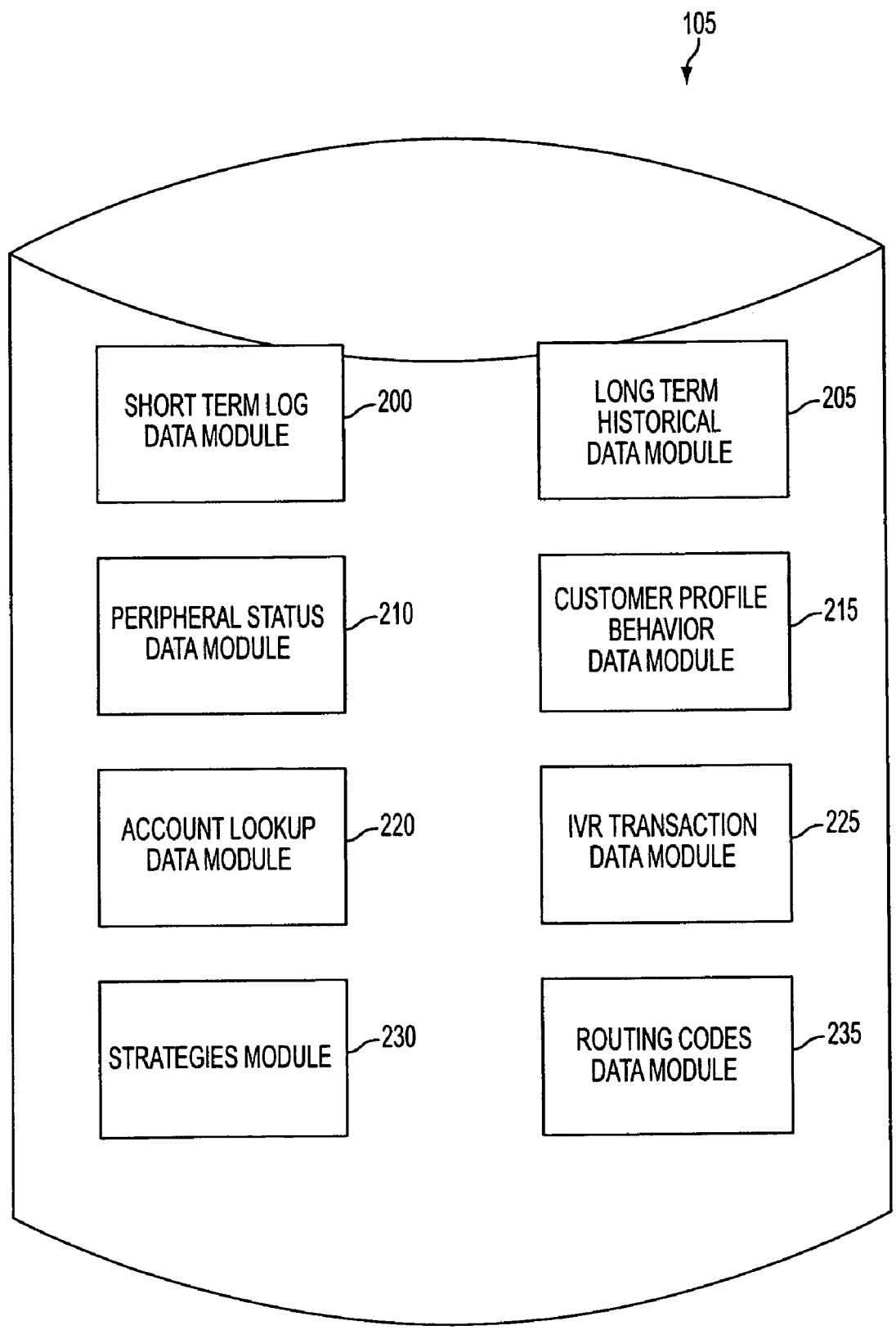
FIG. 2 is a block diagram according to an embodiment of the invention illustrating data that may be stored in a call router database.

FIG. 2 further illustrates CRD 105, which comprises the data maintained by the call routing system, including short term log data module 200; long term historical data module 205; peripheral status data module 210; customer profile behavior data module 215; account lookup data module 220; IVR transaction data module 225; strategies module 230; and routing codes data module 235.

At the outset, those of skill in the art will appreciate that the allocation of the data components of CRD 105, as depicted in FIG. 2, is functional and exemplary. The depicted modules could easily be combined or further divided without departing from the spirit of the invention. The purpose of FIG. 2 is to further explain the invention and is not intended to suggest that any particular database structure must be maintained.

Short term log data module 200 may comprise a module for storing short term data maintained by the call routing system, such as a log of transactions associated with recent calls. For example, if a call has been transferred out of a first site for some reason (e.g., a caller has an unsuccessful transaction with a given agent), short term data may be accessed to ensure that the call routing system reroutes the call to the proper target queue (e.g., not back to the very same agent). Long term historical data module 205 may comprise a module for storing data reflecting long term usage and trends in the call routing system. In one embodiment, the data in long term historical data module 205 may comprise the results of averaging or integrating the short term data. Long term historical data module 205 may store such data as call volume distribution (e.g., across call centers), average wait times, average service times, call distribution across queue types, and so forth.

Peripheral status data module 210 may be a module for storing real-time status information from various system components, such as peripherals at the call centers and IVR systems. Such status information may include information indicating which queues (or agents) are busy or available. Status information stored by peripheral status data module 210 may be used by the strategic decisioning and load balancing logic (discussed further below) performed by central server system 100 to establish viable route return addresses.

Customer profile behavior data module 215 may comprise a data module for storing data reflecting customer profiles and behavior. Strategic decisioning logic, especially as regards proactive servicing or cross-selling, relies on predictions of caller needs based on past purchasing behavior of consumers as well as general demographic data. For example, customers carrying high balances may generally be interested in balance transfers to accounts with lower interest rates. Customers who have engaged in transactions with a partner providing computer equipment may be interested in proactive servicing for Internet services or other computer-related products. Customers who have purchased airline tickets using their credit cards may be interested in special travel packages. Customers meeting certain demographic profiles, for example, particular age groups, may be interested in purchasing certain insurance packages. In general, customer profile behavior data module 215 contains the data that is used by the call routing system to make strategic decisioning predictions about caller needs.

Account lookup data module 220 may comprise a data module storing caller account and identification data. For example, if the caller is a credit cardholder calling in reference to his/her account, account lookup data module 220 can be accessed to retrieve transactions for the last month and other account data. Account lookup data module 220 may further comprise identification data of a caller, such as name, phone number, address, PIN number, and so forth. When a caller first calls, basic information such as calling number ID (number from which the call originates) and/or information submitted to an IVR (such as an account number and/or PIN ID) can be used to identify the caller in the first instance. This information can be further used to retrieve the proper account data for the caller. This process can be referred to as "account recognition". One objective of the instant invention is to maximize account recognition so that proper routing strategies can be established and customer satisfaction is maximized.

IVR transaction data module 225 may comprise a module containing transaction data from the IVR banks (see, e.g., FIG. 1, UVR system1 125 and IVR system2 120). In the preferred embodiment of the present invention, so-called centralized IVR's are employed within the call routing system network to secure additional data from a caller before routing to an individual call site. In this fashion, additional information may be secured from the caller so that the proper account is recognized and strategic decisioning logic and load balancing logic can be employed to route the call to the best target. This reduces unnecessary site interflow and post-routing that plagues conventional systems. IVR transaction data module 225 generally includes data collected from a caller when routed to an IVR, which may prompt the caller to select various options and enter touch-tone digits via menu selection.

Routing codes data module 235 comprises a data module with routing codes associated with particular accounts that correspond to particular routing strategies. For example, routing codes data module 235 may comprise routing codes that indicate that the customer for Account Number 123456 should receive proactive servicing for balance transfers or Internet services. As a result, when that customer calls the virtual call center and his/her account is recognized, routing codes data module 235 will be checked to ascertain whether this customer has been pre-designated for particular servicing. In one embodiment, the routing codes are derived by periodic processing of some combination of profile data from module 215 and/or account data from module 220. This periodic processing to create routing codes may be automated or may entail human intervention.

Strategies module 230 generally contains the logic or scripts for the routing strategies. Scripts refer to the language or set of commands employed by central server system 100 to determine a target site and/or target queue for a given call. In one embodiment, said scripts include logic for strategic decisioning (identifying candidate target queues for a given call) and load balancing (balancing the load across available resources). In the preferred embodiment, strategies module 230 contains the strategies corresponding to routing codes stored in routing codes data module 235.

Call Site Center System

Figure 3:
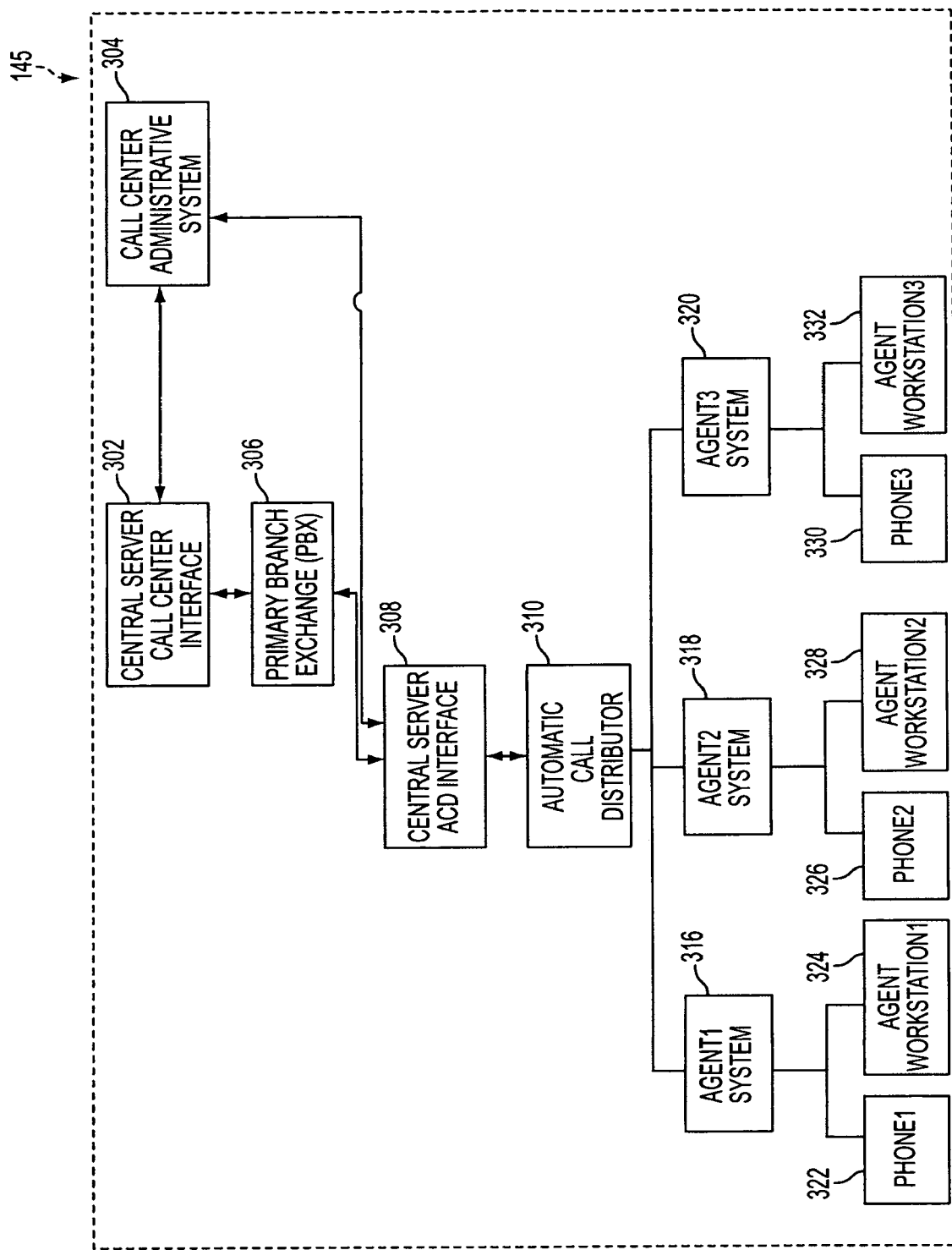
FIG. 3 is a block diagram according to an embodiment of the invention illustrating a call center for receiving calls routed by the call routing system.

FIG. 3 illustrates an exemplary embodiment of call site center system 145, including central server call center interface 302; call center administrative system 304; primary branch exchange (PBX) 306; central server ACD interface 308; automatic call distributor (ACD) 310; agent1 system 316; agent2 system 318; agent3 system 320; phone1 322; agent workstation1 324; phone2 326; agent workstation2 328; phone3 330; and agent workstation3 332. Call site center 145 may further comprise call site VRUs (not depicted), although the need for them is substantially obviated by the centralized VRU banks (modules 120-125) employed by the invention.

In the preferred embodiment, each call site center system interfaces with central server system 100 over a WAN, although those of ordinary skill will appreciate that the interface could encompass other packet-switched technologies for communication between remote systems, such via the Internet, World Wide Web, Internet Protocol Next Generation (IPng), Local Area Network (LAN) and the like. Central server call center interface 302 represents the hardware and software for the interface between call site center systems 145-155 and central server system 100 which, in the preferred embodiment, employs so-called TCP/IP data communications protocol.

Call center administrative system 304 may comprise a computer workstation or the like for administration of each call site center system. This system may be used to monitor activity at the call site center system, modify operating parameters, compile and print activity reports, and perform other administrative functions.

PBX 306 depicts a primary branch exchange device, know in the art, for routing incoming calls to local extensions at the site. As illustrated in FIG. 3, PBX 306 may route incoming calls to agents through ACD 310.

Central server ACD interface 308 represents software and hardware for ACD 310 to interface with central server system 100. ACD 310 is a programmable automatic call distributor device, know in the art, for routing incoming calls to so-called targets at the call center, here to the various agent systems. Agent1 system 316, Agent2 system 318 and Agent3 system 320 may comprise a plurality of agent systems for qualified agents to service calls. Each agent system may be comprised of one or more agents and a phone and workstation, as depicted by phone1 322/agent workstation1 324, phone2 326/agent workstation3 328, and phone3 330/agent workstation 332. The agent workstations may be used to display caller information to the agent, such as identification and account information, as well as handling strategy information forwarded by central server system 100. In the preferred embodiment, agents will "log-in" to those queues for which they qualify.

The IVR Banks

Figure 4:
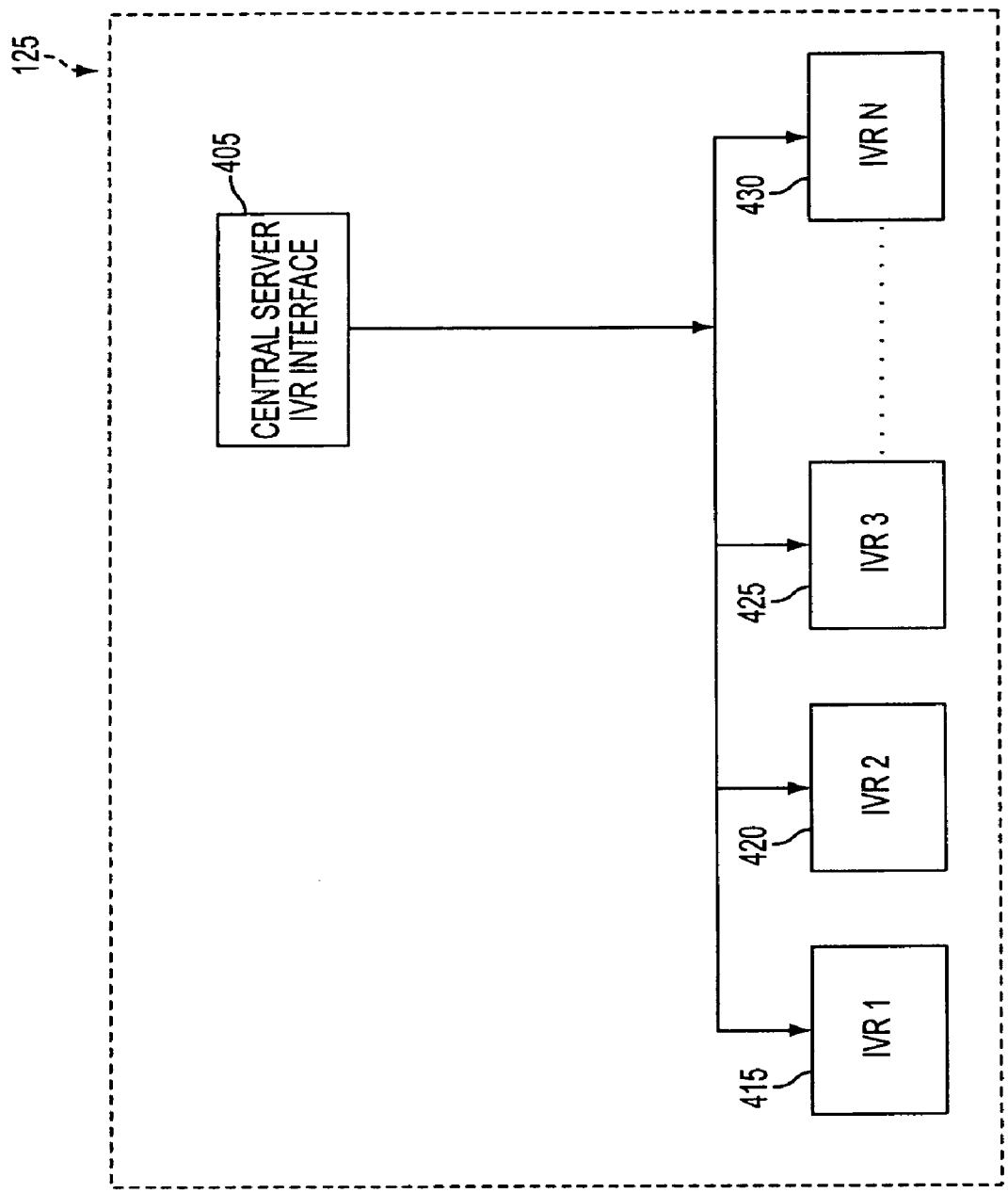
FIG. 4 is a block diagram according to an embodiment of the invention illustrating an UVR system, including a control server, interface and series of individual IVR's, for receiving caller information in order to facilitate proper routing.

The IVR (Interactive Voice Response Unit) systems, e.g., IVR system1 125, may comprise a series of IVR devices, as illustrated in FIG. 4. In the preferred embodiment, the call routing system comprises two centralized IVR banks comprising IVR system1 125 and IVR system2 120. In this exemplary embodiment, IVR system1 125 comprises central server IVR interface 405; and a series of individual IVR devices IVR1 415, IVR2 420, IVR3 425 and IVR N 430.

Central server IVR interface 405 represents hardware and software for interfacing the IVR banks with central server system 100. In the preferred embodiment, the data communications protocol is TCP/IP, although those of ordinary skill will appreciate that other formats may be used. Regarding load balancing, central server system 100 may load balance between IVR system1 125 and IVR system2 120. Status information regarding the operational states of the IVR's is forwarded from IVR system1 125 and IVR system2 120 for the purposes of load balancing so that the proper (pre)route return address can be computed (see, e.g., FIG. 2, module 225).

As touched upon previously, IVR system1 125 and IVR system2 120 are considered "system level" or centralized IVRs that improve the performance of the instant call routing system compared to conventional approaches. Conventional systems generally provide a central server for prerouting (from the long distance exchange to a target within the call router network, such as a call site) and post-routing (from the target to another node in the call router network). Conventional systems rely on limited information for pre-routing (such as originating call number and called number) so that it is not uncommon that upon arrival at the target device, a call must be forwarded out of a first call site to a second call site for proper servicing (the interflow problem) or to another target within the first call site (the re-routing problem).

By incorporating shared IVR systems within the call routing network (e.g., modules 120 and 125) before a call is forwarded to a local call site, additional information can be received so that it is more likely that the correct account is recognized and the proper routing strategy is computed. The effect is that the so-called hit-rate (% of calls properly routed) increases dramatically, costs are reduced, and revenues and customer satisfaction are improved.

Prior systems employed premises-based VRUs (at the call sites) or network-based VRUs. Premises-based VRU systems often result in suboptimal account recognition and site interflow problems. Network-based VRU systems sometimes referred to as "network level prompting," direct incoming calls to a VRU within the long distance carrier network (e.g., IXC 130, FIG. 1). Network level prompting may increase account recognition somewhat (over premises-based VRUs) because the customer provides additional information (via touch tone input) before the call is routed. There are significant disadvantages, however. First, there is no full access to the call router database (e.g., CRD 105) since the VRU is within the external long distance carrier network. Second, network level prompting VRU's generally do not provide full automated service and account access if the caller decides not to switch out of the automated system. It has been found that typically about fifty percent (50%) of calls terminate at the VRUs. Thus, the centralized VRUs of the present invention have the advantage of providing full access to the account data in the CRD database if the caller does not require human servicing. It has also been found that account recognition has increased from about 60% to approximately 78-85% in moving from a network level prompting virtual call center to one employing the centralized VRUs of the present invention.

Queuing and Partnering in the Call Routing System

Figure 5:
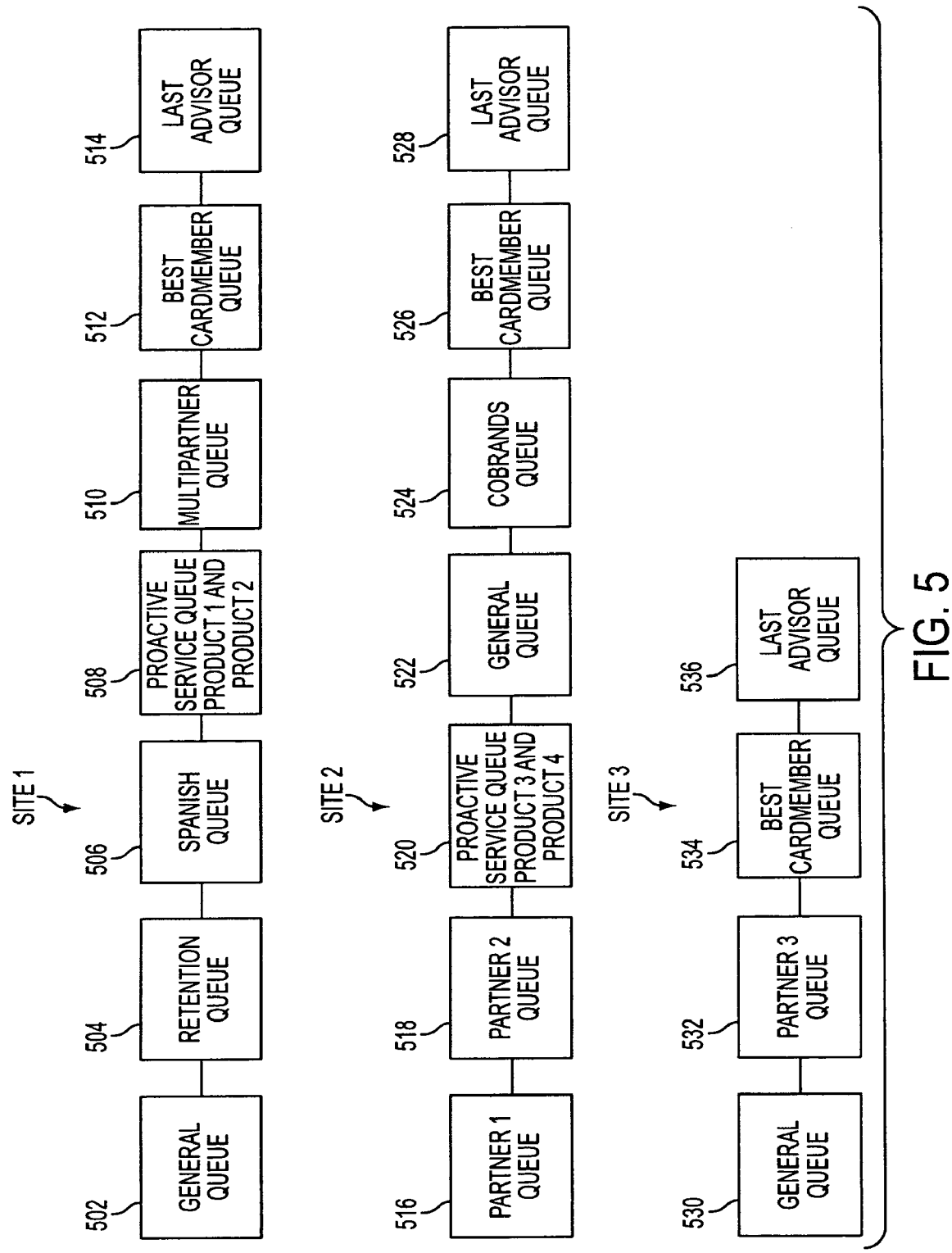
FIG. 5 is a block diagram according to an embodiment of the invention illustrating the concept of queue assignment at the call site centers.

FIG. 5 illustrates the concept of call queues supported by the call routing system. Queues represent categories of skill sets or subject matters that are supported by agents. Each call site center may support a variety of queues depending on the services provided by the virtual call center provider and associated partners. Agents may be qualified to support different queues (so-called multiple queue assignment or MQA) and may even have skill level designations to differentiate capability for a given queue. By way of example, a first agent may be qualified to support the general queue as well as a Spanish queue at skill level 2. Another agent, who happens to be more fluent in Spanish, may be assigned to the Spanish queue at skill level 1. Agents generally log in to the appropriate queues when they begin servicing calls, although some queue assignments may be automated (e.g., last advisor queue, discussed below).

FIG. 5 illustrates the queue concept for an exemplary embodiment of the call routing system. In the call routing system of FIG. 5, there are three call site centers, site 1, site 2, and site 3. Each site supports a series of different queues. Site 1 supports general queue 502 for so-called general service calls. In the preferred embodiment, where the virtual call center provider provides credit card services, general queue 502 provides general service associated with a cardholder's account, such as balance inquiries, disputed charges, lost or stolen card reports, and the like. Retention queue 504 represents a queue for retaining customers who may be terminating their account or whose service agreement term is near an end. Spanish queue 506 is provided to service callers requiring a Spanish-speaking agent. Proactive service queue product 1 and product 2 represents a queue assigned for proactive servicing or marketing associated with two designated products (or services). Multipartner queue 510 may be a queue for supporting several different partners as a consolidated queue. Best cardmember queue 512 represents a queue assigned for servicing valued callers, such as cardmembers with excellent payment histories or especially profitable accounts. Last advisor queue 514 is a queue assigned for routing a caller to the advisor who serviced him/her during the last call. For example, a caller engaged in an ongoing discussion regarding a disputed charge may prefer to deal with the agent familiar with the matter.

According to FIG. 5, another call site center system at site 2 comprises partner 1 queue 516 for servicing calls for a first partner, partner 2 queue 518 for servicing calls for a second partner, proactive service queue product 3 and product 4 520 (similar to block 508), general queue 522, cobrands queue 524 for servicing cobranded products or services, best cardmember queue 526, and last advisor queue 528. Yet another call site center system at site 3 comprises general queue 530, partner 3 queue 532, best cardmember queue 534 and last advisor queue 536.

The operation of the call routing system is such that data is stored (e.g., by call center administrative system 304) reflecting the various queues that each agent can support. Additionally, each agent logs in so that central server system 100 can perform the strategic decisioning and load balancing functions based on up-to-date information of agents (and their specialties) actually available.

Figure 6:
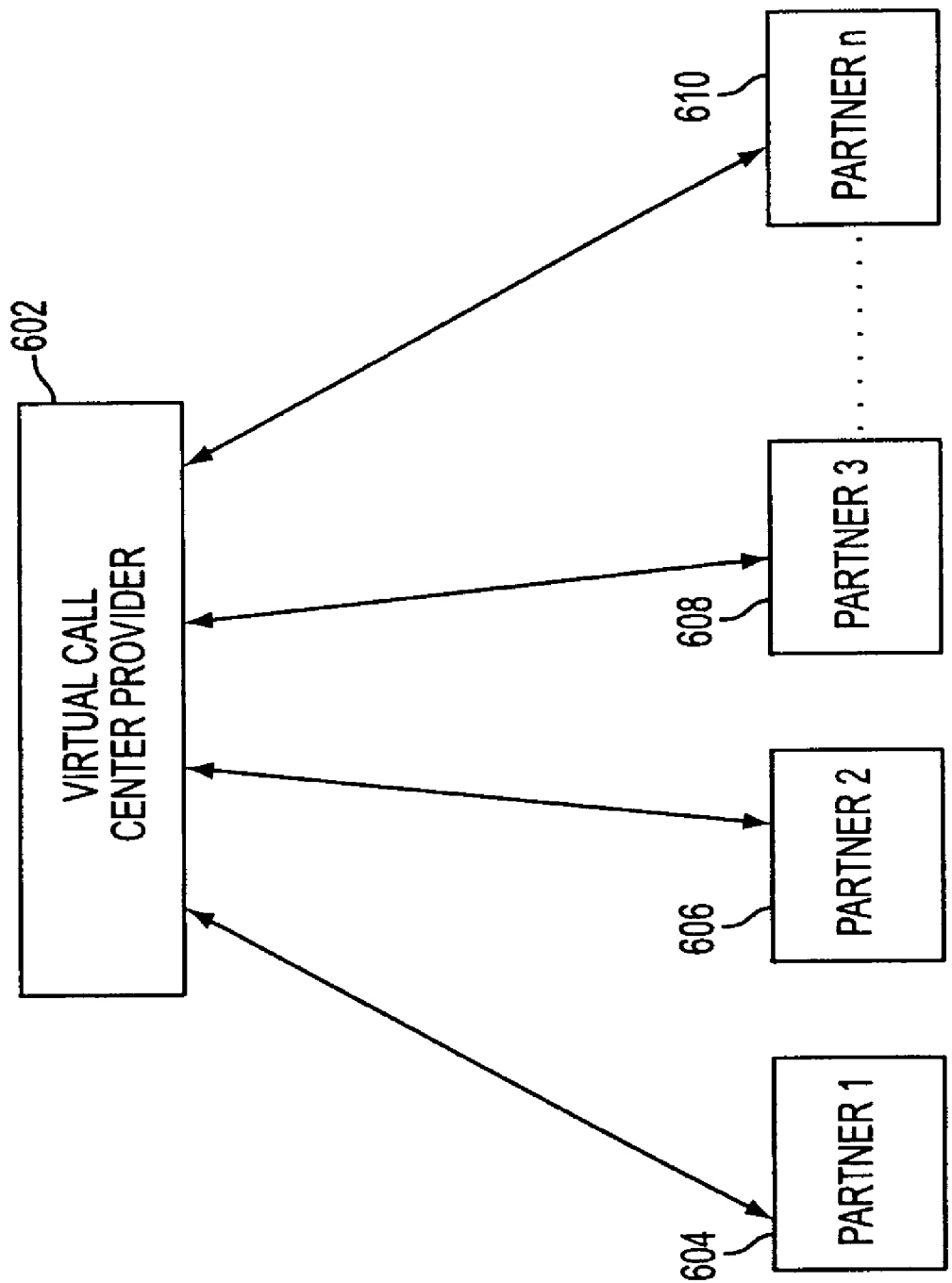
FIG. 6 is a block diagram according to an embodiment of the invention illustrating the partnering concept for servicing of multiple business concerns using the call routing system.

FIG. 6 illustrates the partnering concept of the call routing system. In the preferred embodiment, a virtual call center provider 602 (e.g., a credit card service provider) "partners" with a series of other business concerns, such as merchants or service providers. Thus, the call routing system supports not only the virtual call center provider's service requirements, but also those of partners. The benefit is that costs are spread among the different business concerns so that partners, who otherwise may be unable to finance their own virtual call center, can provide service and marketing heretofore limited to larger, well-capitalized concerns. Moreover, by partnering, the call router system provides cross-marketing or cross-selling opportunities not otherwise feasible. According to the exemplary scenario of FIG. 6, virtual all center provider 602 also supports call routing for partner 1 604, partner 2 606, partner 3 608 and partner n 610.

Overview of a Method for Call Routing

Figure 7:
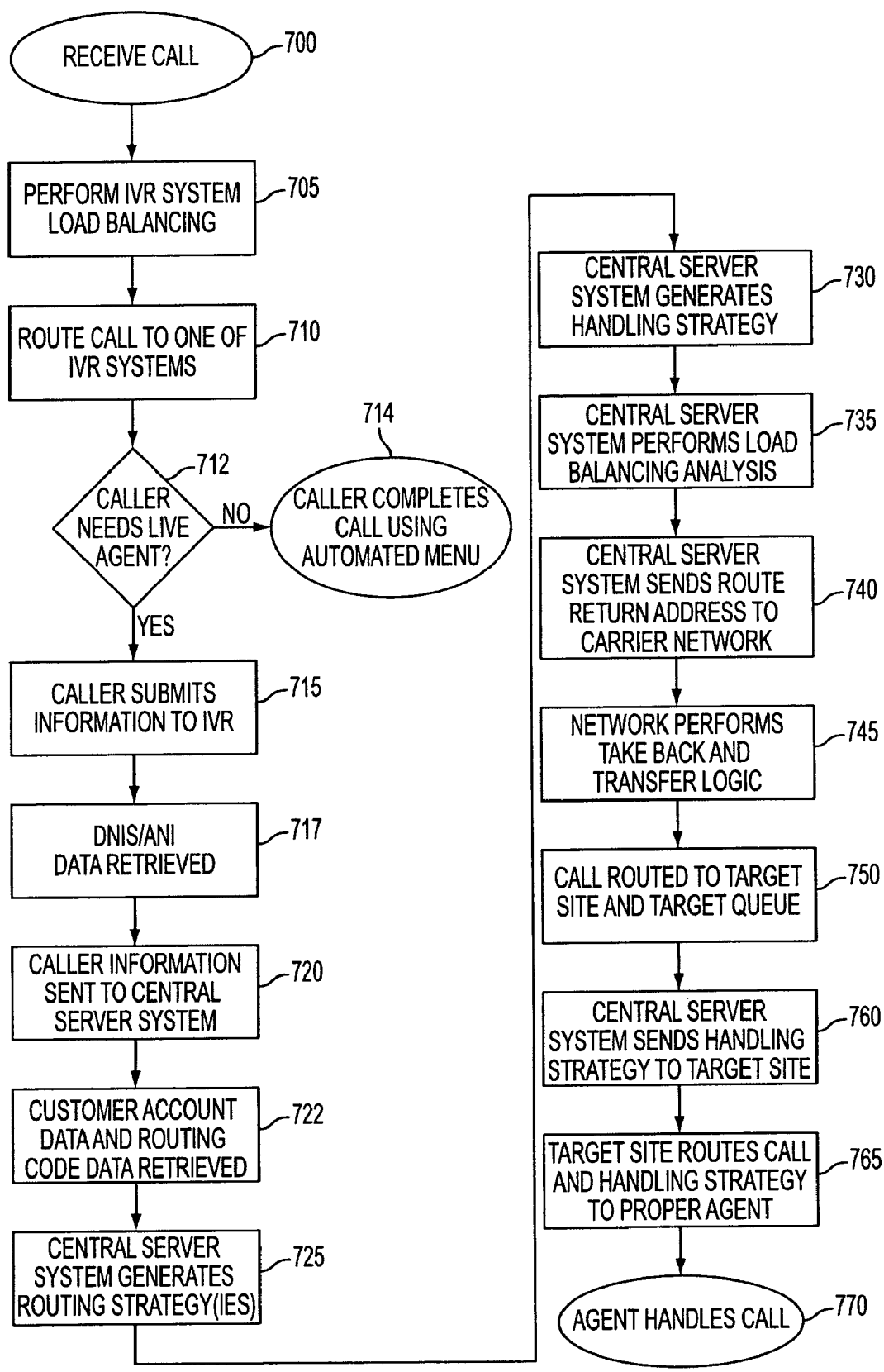
FIG. 7 is a flowchart illustrating a method, according to an embodiment of the invention, for servicing callers using the call routing system.

FIG. 7 is a flowchart illustrating a method for call routing according to one embodiment of the present invention. The call routing system receives a call, according to step 700. Referring to FIG. 1, the call may be routed through LXC 135 to IXC 130, where a route request is passed to central server system 100 through IXC interface 127, indicating that a call has been placed. Next, the call routing system performs IVR system load balancing, according to step 705. In the embodiment illustrated by FIG. 1, central server 100, based on status information received from the IVR banks (blocks 120 and 125), may perform load balancing to determine which of the IVRs should receive the call.

According to step 710, the call is pre-routed to one of the IVR systems. According to decision block 712, the caller may either select automated servicing ("No"), in which case automated servicing and account access will be provided without human intervention, according to step 714. If the caller desires servicing by a live agent ("yes") he/she can indicate that by entering a digit such as "#" or "0". According to step 715, the caller submits information to the UVR device, such as keypad entries for account number, PIN, phone number, etc. According to step 717, the call routing system retrieves DNIS (dialed number identification service) or ANI (automatic number identification) data based on the called number or originating number. As will be further explained in connection with FIG. 10, the call routing system may support toll-free calls to one of several 800 numbers or the like. Certain 800 numbers may be assigned to certain partners or queues, so that calls to partner-specific 800 numbers will be routed directly to those partner queues.

The caller information submitted to the IVR is sent to central server system 100, according to step 720, and the central server system attempts to identify or recognize the account, according to step 722, and retrieves account and/or routing code data. According to step 725, central server system 100 generates a routing strategy based on the caller information. Based on the preroute information and information from the database (see, e.g., customer profile behavior data module 215, routing codes data module 235, and strategies module 230), several routing strategies may be obtained. For example, central server system 100 may determine the caller, who is seeking a limit increase, should be routed to a general queue. Based on demographic and customer profile data, central server 100 may also determine that this caller is a good candidate for proactive servicing for products 2 and 4. In this case, central server system 100 provides a first routing strategy for sending the call to site 1 to an agent qualified for general queue 502 and proactive service queue product 1 and product 2 508 (see FIG. 5). Likewise, a second routing strategy is obtained for sending this call to site 2 to an agent qualified for general queue 522 and proactive service queue product 3 and 4 520. This step may further comprise arbitration logic to determine which of the several candidate routing strategies will be selected.

According to step 730, central server system 100 generates a handling strategy corresponding to each routing strategy. For example, for the first exemplary strategy discussed above, a handling strategy informs the agent that this caller seeks a limit increase and may be interested in product 2. According to step 735, central server system 100 performs load balancing analysis to rationally distribute the call load among available queues (e.g., among the agents staffing call site systems 1-3, modules 145-155, FIG. 1). As mentioned previously, the load balancing analysis is based on substantially real-time status information received from the various components of the call routing system.

According to step 740, central server system 100 provides a route return address to the long distance network (e.g., to IXC 130 through IXC interface 127). The network utilizes so-called take back and transfer™ logic or the like, according to step 745, to take the call from inside the call routing system network and route it to the designated target (e.g., a particular call site system and queue), according to step 750. Those of ordinary skill will appreciate that the present invention is not limited to any particular technology for routing the calls from the IVR banks (blocks 120-125) back through the phone network to the target site, and that so-called take back and transfer technology™ is but one means for accomplishing the desired result.

According to step 760, central server system 100 sends a handling strategy to the target site, which can be presented at an agent workstation (e.g., agent workstation1 324, FIG. 3) for personalized treatment. The target site routes the call and handling strategy to the proper agent, according to step 765, and the agent handles the call, according to step 770.

Strategic Decisioning and Routing Strategies

Figure 8:
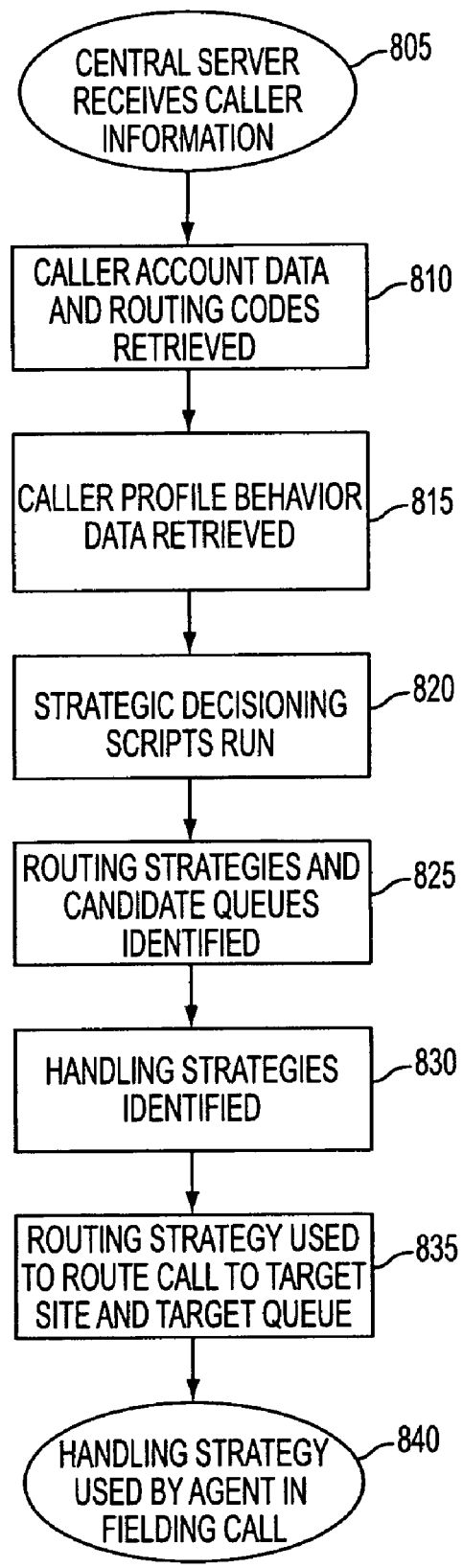
FIG. 8 is a flowchart illustrating a method, according to an embodiment of the invention, for the central server system to prepare routing and handling strategies to facilitate the delivery of a general 800# call to a qualified agent.
Figure 10:
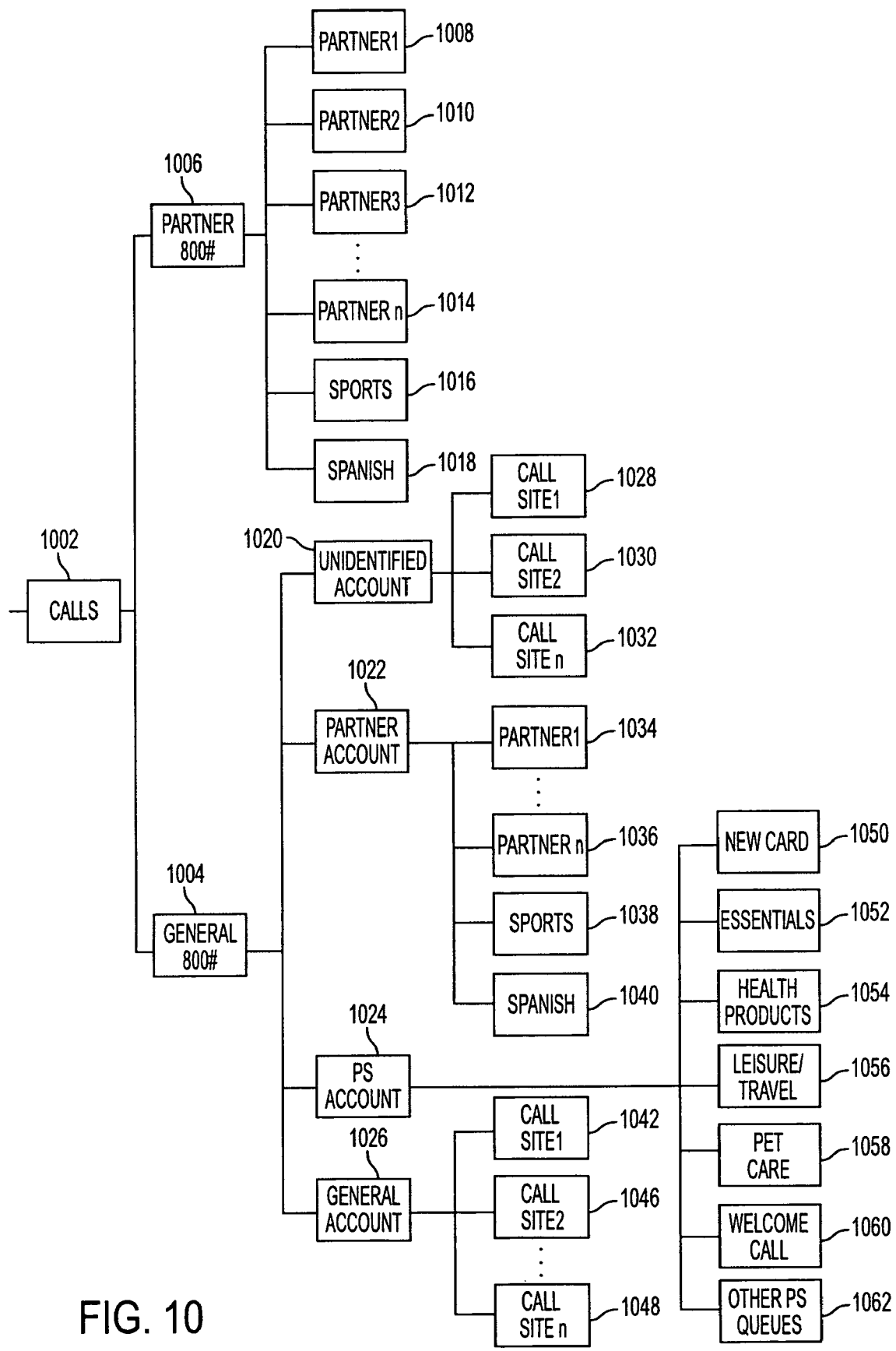
FIG. 10 is a diagram illustrating, according to an embodiment of the invention, the potential routing paths of a call placed to a toll-free number for the call routing system.

FIG. 8 is a flowchart further illustrating the routing strategy generated by central server system 100 to route calls to queues at call site systems when a general 800# is called (see block 1004, FIG. 10). According to step 805, central server system 100 receives preroute information for the call. As previously discussed, this may comprise information such as called number, originating number and data collected by one of the IVR banks, i.e., IVR system1 125 and IVR system2

120. Caller account data and routing codes are retrieved from account lookup data (see, e.g., account lookup data module 220 and routing codes data module 235, FIG. 2), according to step 810. According to step 815, caller profile behavior data (see, e.g., customer profile behavior data module 215, FIG. 2) is retrieved. Based on the retrieved data, strategic decisioning scripts are run, according to step 820, in order to generate one or more routing strategies and candidate queues for the call, as in step 825 (see, e.g., modules 230 and 235, FIG. 2). Generally, a routing strategy generates a proposed queue or queues for a given call and the appropriate return address data. As those of ordinary skill will appreciate, the strategic decisioning scripts will be a function of the composition of the various queues in a given call decisioning system, and are readily developed as a combination of logical statements or so-called "scripts" developed for call routers.

A handling strategy is identified by central server system 100, as in step 830, so that an agent fielding the call is provided information appropriate to the routing strategy. The routing strategy selected is then used to route the call to the proper target site and site queue, according to step 835. Finally, the handling strategy is used by the agent who receives the call, as in step 840.

Figure 9:
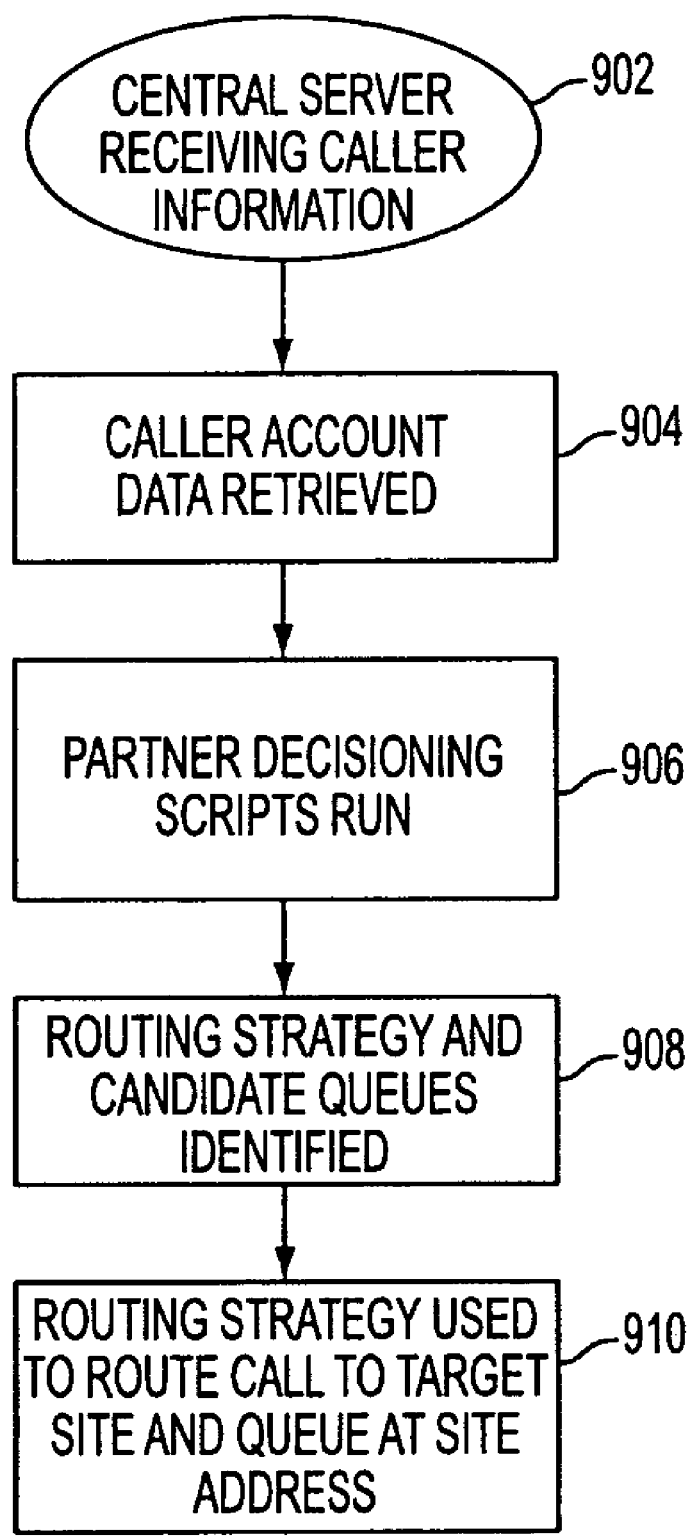
FIG. 9 is a flowchart illustrating a method, according to an embodiment of the invention, for the central server system to prepare a routing strategy for delivery of a partner 800# call to a qualified agent.

FIG. 9 is a flowchart further illustrating the routing strategy generated by central server 100 to route calls when a partner 800# is called (see block 1006, FIG. 10). Central server system 100 receives the caller information, according to step 902. Caller account data is retrieved from the account lookup data, as in step 904. Partner decisioning scripts are run, as in step 906. Since the virtual call center supports not only the so-called main business concern, but also the partners, each partner may provide its own decisioning scripts which could be stored in a module such as strategies module 230 of FIG. 2. According to step 908, one or more routing strategies and candidates queues are identified. According to step 910, the selected routing strategy is used to route the call to the proper call site and queue.

A Call Flow Diagram for a Call Routing System

FIG. 10 illustrates the various paths that may be taken by a virtual call center according to one embodiment of the invention. Calls 1002 may comprise general 800# calls 1004 or partner 800# calls 1006. Thus, the call routing system may accept toll-free calls with numbers dedicated to specific partners, or a general number for the system. If the dialed number corresponds to a partner 800#, the call is routed to a dedicated partner queue, such as to partner 1 1008, partner 2 1010, partner 3 1012 and partner n 1014. Even when the dialed number corresponds to a partner 800#, queues for special needs such as Spanish 1018 or for proactive selling like sports 1016 (for sports products) may be supported.

If call 1002 corresponds to general 800# 1004, the call routing system logic provides for treatment in one of several categories. Based on preroute information, the call may be treated as partner account 1022, and routed to one of the queues partner 1 1034 through partner n 1036, sports 1038 and Spanish 1040. If preroute information does not permit central server system 100 to identify the account, the call is treated as unidentified account 1020. In this case, the call is forwarded to one of the call site systems, such as call site 1 1028, call site 2 1030 and call site n 1032, so that additional information can be requested from the caller. In one embodiment, such calls will be more or less equally load distributed across the call site center systems (here call site 1 1028 through call site n 1032) and routed to a general queue.

If preroute information determines the caller requires general information about his/her account (e.g., a balance inquiry), then the call is treated as general account 1026 and, will be routed in a load-balanced fashion to one of call site 1 1042, call site 2 1046, and call site n 1048, each of which supports a general queue.

Finally, if the strategic decisioning logic determines that the call is appropriate for proactive servicing, then appropriate routing and handling strategies are generated, and the call may be treated as new card 1050 (new cardmembers), essentials 1052 (home products and the like), health products 1054 (vitamins, supplements and the like), leisure/travel 1056, pet care 1058 (products and services for pets), welcome call 1060 (first-time callers) and other PS queues 1062.

Intelligent Call Routing Based on Account-Level and Optimization Parameters

By considering account-level and behavioral information, embodiments of the present invention optimize cross-selling of other products to in-bound callers to customer service representatives (CSRs). By way of non-limiting example, accountholder John Doe calls in to have his credit card account serviced. The CSR will see a pop-up menu on the CSR's terminal display that indicates the John Doe should be offered several cross-sell products or services, such as, by way of non-limiting example, credit balance insurance, home equity line of credit, or privacy services. The list of designated cross-sell products or services is selected based on account-specific information (i.e., specific to John Doe's account) and/or behavioral specific information (i.e., specific to John Doe's observable behavior). The list of designated products or services is also prioritized. The prioritized list may be addressed by the CSR, or the call might be routed from the CSR to another agent appropriate for the products in the list.

Embodiments of the present invention involve an optimization algorithm for strategic decisioning. This algorithm typically has three outputs: (1) whether to route a particular caller to a cross-sell offer presentation, (2) the list of products or services for that caller (if routed), and (3) the priority of the products or services in the list. The inputs to the algorithm are generally based on an expected value computation that factors in the following:

(1) Call Probability—the likelihood the customer will call at least once that month; empirically derived for each account and caller pair; a probability value between zero (0) and one (1);

(2) Eligibility—a binary variable of either zero (0) for ineligible or one (1) for eligible; determined according to eligibility considerations such as, by way of non-limiting example:

(a) Legitimacy—whether the caller is eligible for a product based on eligibility requirements (e.g., no home equity offers for those who don't own a home);

(b) Partner Restrictions—restrictions imposed by system partners (e.g., no selling of age-inappropriate items to accountholders who are AARP members in a Bank One/AARP partnered card); and (c) Resting Restrictions—withholding offer presentations if the caller has already rejected the offer during a certain period or a certain number of time, or has already accepted the offer and cannot accept it again (e.g., if accountholder John Doe has been offered product X the three previous months, then do not offer him that product if he calls this month);

(3) Response Rate—likelihood the caller will accept a given offer; a predicted value typically based on empirical data from many callers; a probability value between zero (0) and one (1);

(4) Constraints and/or Objectives—e.g., Net Present Value (NPV). NPV is essentially the profit to the offeror (the expected profit for a product if the offer is accepted; a dollar value).

The inputs identified above are generally used to compute an expected value for each accountholder and offer combination so that the algorithm can determine the three above-noted outputs. From those computations, each month an embodiment of the invention will provide a prioritized list of cross-sell products or services available for each accountholder should he or she call. The expected value computation is generally computed as, by way of non-limiting example: the expected value equals the product of the call probability, the product eligibility, the response rate, and a financial parameter, such as NPV, from the constraints and/or objectives. Although net present value is presented above as being a typical objective in the optimization algorithm, other constraints and/or objectives may be added or substituted therefore. By way of non-limiting example, instead of or in addition to net present value, the following financial parameters may be used and optimized: revenue (maximize), responses (maximize), cost (minimize), loss (minimize), call volume (maximize), and gross profits (maximize).

In general, two distinctions between embodiments of the present invention and the prior art are: (1) embodiments of the present invention generally determine call routing/cross-selling based on expected value optimization computations; and (2) embodiments of the present invention generally determine call routing/cross-selling based on account-level and/or behavioral data.

Figure 11:
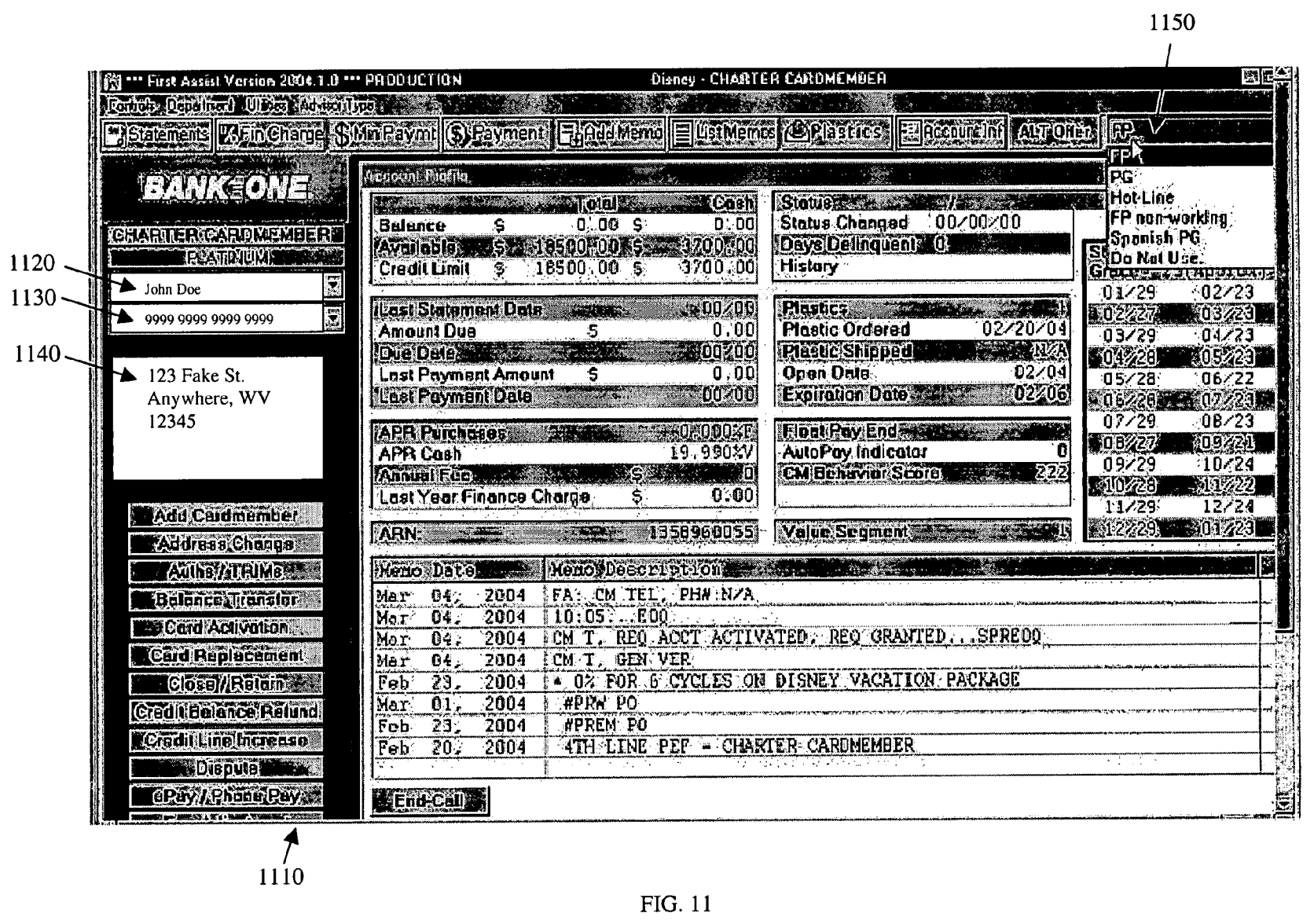

FIG. 11 is a schematic diagram depicting a graphical user interface 1110 that includes a routing list 1150 of cross-sell offer presentations generated according to an embodiment of the present invention. A CSR may use the graphical user interface to assist the customer and, possibly, to further route the customer's call according to a call-routing strategy associated with routing list 1150. As described above, the system gathers customer specific and/or account specific data to achieve account recognition. Based on these data, the central server system retrieves a pre-formed call-routing strategy associated with the customer, and forwards it to a CSR's terminal. The CSR's terminal displays graphical user interface 1110, which includes the name of the customer 1120, the account number 1130, and the customer's address 1140. Graphical user interface 1110 also includes routing list 1150 of cross-sell presentations consistent with the customer's associated call-routing strategy. The CSR is able to view routing list 1150 and possibly route the call in accordance therewith by clicking on a selected offer presentation. Such routing may be to another CSR who specializes in presenting that particular offer, or may be to a VRU dedicated to presenting that offer. Alternately, or in addition, the CSR may present the offer to the customer without further routing. The top five offer presentations for which the customer is eligible are included in routing list 1150. The CSR may route the call to any other offer for which the customer is eligible by manually selecting such an offer presentation.

Figure 12:
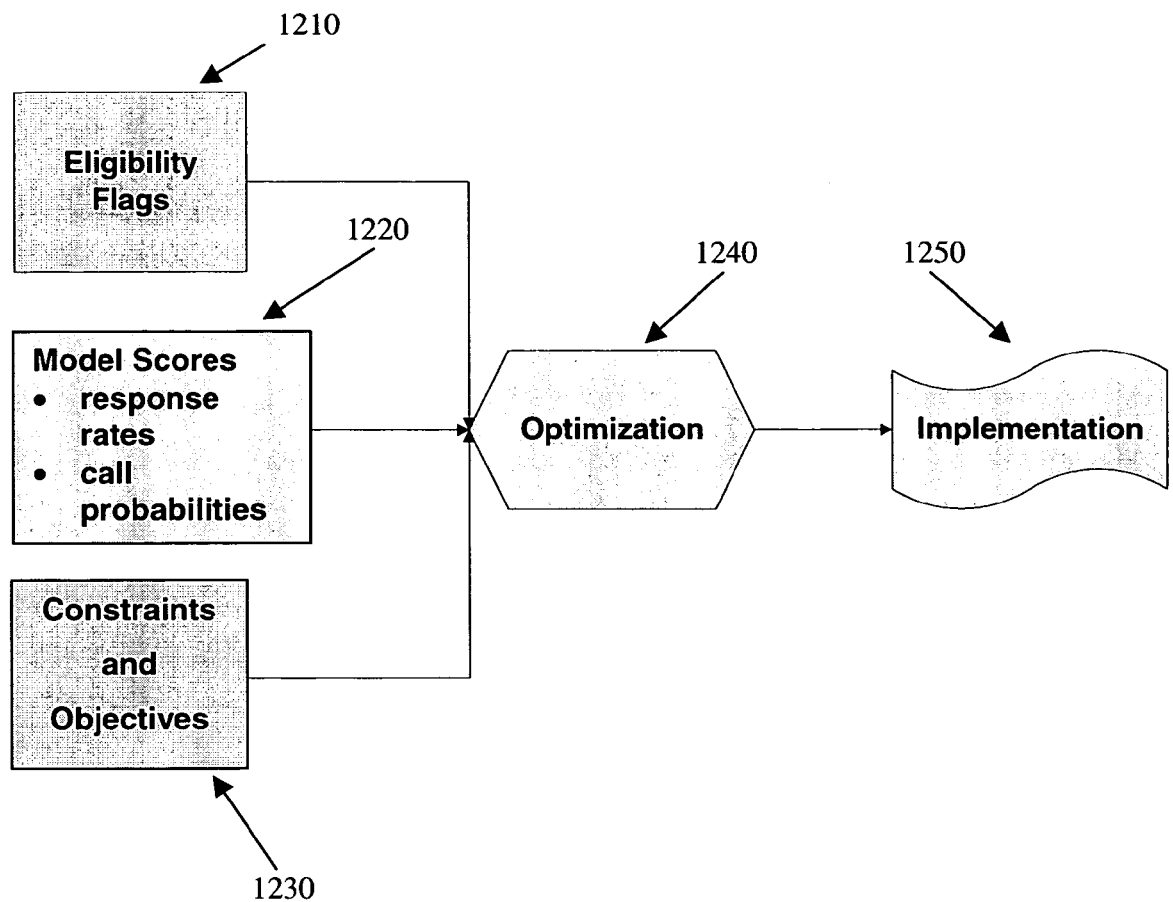
FIG. 12 is a basic flow chart depicting strategic decisioning based on account-level and optimization parameters in an embodiment of the invention.

FIG. 12 is a basic flow chart depicting strategic decisioning based on account-level and optimization parameters in an embodiment of the invention. On regular intervals (e.g., monthly), the system initiates generation of a cross-sell call-routing strategy for each customer. For each customer and each offer presentation, strategic decisioning logic accepts three inputs: an eligibility flag 1210, model scores 1220, and constraints and objectives 1230 (such as, by way of non-limiting example, a net present value).

Eligibility flags indicate whether the customer is eligible for a particular offer. A customer may be designated as ineligible for a particular offer because the customer cannot legitimately accept the offer. Such a situation may occur, by way of non-limiting example, where the offer is for a home equity loan, yet the customer is not a homeowner. Other ineligibility situations arise when a partner of the service provider imposes restriction as to the types of offers its customers may receive. By way of non-limiting example, a partner may be an organization devoted to offering services to retirees. Such a partner might insist that its customers not receive age-inappropriate offers. The customer himself or herself may also impose an ineligibility. By way of non-limiting example, the customer may refrain from opting-in or may opt-out of receiving offers. In such a situation, the customer's account will include a do not solicit (DNS) eligibility flag.

A fourth type of ineligibility for an offer occurs when a customer has already received that particular offer. Account lookup module 220 of FIG. 2 stores a record of all offers that have been extended to the customer. Once a customer has been exposed to a particular offer one or more times, the strategic decisioning logic may impose a "resting period" during which the customer will not receive the same offer again. The resting period may be any time period, e.g., several hours, days, or months, or may be permanent. A resting period may be imposed after a particular offer has been extended only once, or may be imposed only after an offer has been extended a fixed number of times, possibly within a certain fixed time period. For example, a resting period may be imposed after an offer has been extended three times, or it might be imposed only if the offer has been extended three times within any thirty-day period. Certain offers can only be accepted once (e.g., an offer for account privacy protection). Once such offers have been accepted, the system imposes a permanent resting period.

On the data structure level, each eligibility flag preferably takes on one of two values: zero (0) to indicate that the customer is ineligible for the offer, and one (1) to indicate that the customer is eligible for the offer. For multiple offers, the eligibility flags are represented as a string of binary values, one for each offer. For example, an eligibility flag string corresponding to two offers could take on the following values: (0,0), (0,1), (1,0), and (1,1). These eligibility string values, and the customer population with which each is associated, are referred to as eligibility segments.

The strategic decisioning logic also accepts model scores 1220 as an input. For each individual customer, model scores 1220 may be computed based upon global mathematical models of all (or some subset of the entire population of) customers, based on that customer's account and behavioral parameters, or based on a combination of global and individual customer parameters. Model scores 1220 are typically probabilities, and are therefore typically represented as values from zero (0) to one (1), inclusive, at the data structure level. There are generally at least two types of model scores 1220: offer response rates and call probabilities. An offer response rate is preferably a probability that the customer will accept a given offer upon exposure to that offer. Offer response rates are generally based on empirical data collected from a population of customers in accepting the offer. By way of non-limiting example, an offer response rate may be computed as the ratio of offers accepted by the sample space of customers to offers extended to the sample space of customers. More sophisticated models that take into account the particular buying habits of the customer at issue are also contemplated. By way of non-limiting example, the aforementioned offer response rate ratio may be weighted by an individual customer's response ratio.

Call probabilities are also types of model scores 1220. A call probability represents the likelihood that a particular customer will call within a particular time period. By way of non-limiting example, a call probability may indicate the likelihood that the particular customer will call that month. A call probability is preferably derived from empirical data regarding each account holder. However, more sophisticated models that take into account properties of the global customer base in predicting the call probability for a particular customer are also contemplated. In general, call probabilities are optional parameters in the strategic decisioning logic.

Other types of model scores may also be incorporated with or substituted for the aforementioned response rates and call probabilities. By way of non-limiting example, suitable model scores include cost predictions, profitability predictions, loss predictions, and other financial parameters.

The strategic decisioning logic also accepts a constraints and objectives 1230 as inputs. Constraints and objectives 1230 include both business and call center parameters. Business parameters include financial values such as profit, loss, present value, revenue, and cost. Call center parameters include call-handling resources and minimum leads requirements (discussed further below in reference to FIG. 13).

A typical quantity that may be included in constraints and objectives 1230 is net present value (NPV). Generally, NPV 1230 represents an estimate of the net present value to the offeror if the offer is accepted. For example, NPV 1230 may represent the present value of all lifetime costs and benefits associated with a single sale of an offered product or service. NPV 1230 therefore may include the costs of making the sale and the expected five-year revenue and expenses associated with that sale. NPV 1230 may incorporate parameters for attrition, billing, average customer balance, tax consequences, interest or discount rate, and terminal value after five years. Conventional present-value calculation techniques may be used to compute the present value of the resulting income and expense streams associated with a particular sale.

Accordingly to an embodiment of the present invention, the strategic decisioning logic gathers eligibility flags 1210, model scores 1220, and constraints and objectives 1230, and uses these data to compute an expected value for each offer relative to each customer. The expected value may be computed as, by way of non-limiting example, the product of a financial parameter from the constraints and objectives, the call probability, the offer response rate, and the eligibility flag for that offer. As discussed above, the call probability is an optional parameter. When the constraints and objectives are limited to a net present value, the expected value is referred to as an expected net present value (ENPV). The ENPV is intended to represent, for each customer and each offer, the expected value to the offeror. The ENPV therefore generally represents the net present value of a sale weighted by the probability that the sale will occur. For purposes of discussion and by way of non-limiting example, the expected value will be considered to be an ENPV for the remained of the description of FIG. 12.

At 1240, the strategic decisioning logic forms a call-routing strategy by ordering selected offers according to optimal ENPV and other parameters. In one approach, the call-routing strategy selects the offer with the highest ENPV for the highest priority within the call-routing strategy. The strategic decisioning logic places the offer with the next-highest ENPV second, and so on, until all offers with an ENPV over a threshold amount are entered into the strategy. This prioritizing of offers could readily be implemented according to other values. Such values would be prioritized in a manner consistent with the optimization of ENPV described herein. By way of non-limiting example, such values may include any, or a combination of: revenue (maximize), responses (maximize), cost (minimize), loss (minimize), call volume (maximize), gross profits (maximize), and NPV (maximize). As discussed below in reference to FIG. 13, the call-routing strategy may be further optimized according to call-handling resource availability and minimum lead requirements.

Once formed, the call-routing strategy is implemented at 1250. The implementation may be automatic or manual. In particular, the call may be automatically routed by the central server (and/or IVR banks) in accordance with the call-routing strategy. Alternately, as discussed above in reference to FIG. 11, the call-routing strategy may be forwarded to a customer service representative terminal to be displayed in graphical list form. The CSR may make an offer presentation him or herself, may manually implement all or any portion of the call-routing strategy, or may defer to the system for call-routing strategy automatic implementation.

Regardless of whether automatic or manual, a customer's call may be routed to an offer presentation in accordance with the call-routing strategy either before or after the customer's purpose for calling in has been satisfied. For example, the customer may have called the central server in order to inquire about the customer's account balance. The customer's call may be routed to the highest-ranked offer presentation in the customer's associated call-routing strategy either before or after the customer has completed the balance inquiry transaction. In either case, the system may route the call automatically, or a CSR may route the call manually by using the graphical user interface of FIG. 1.

Figure 13:
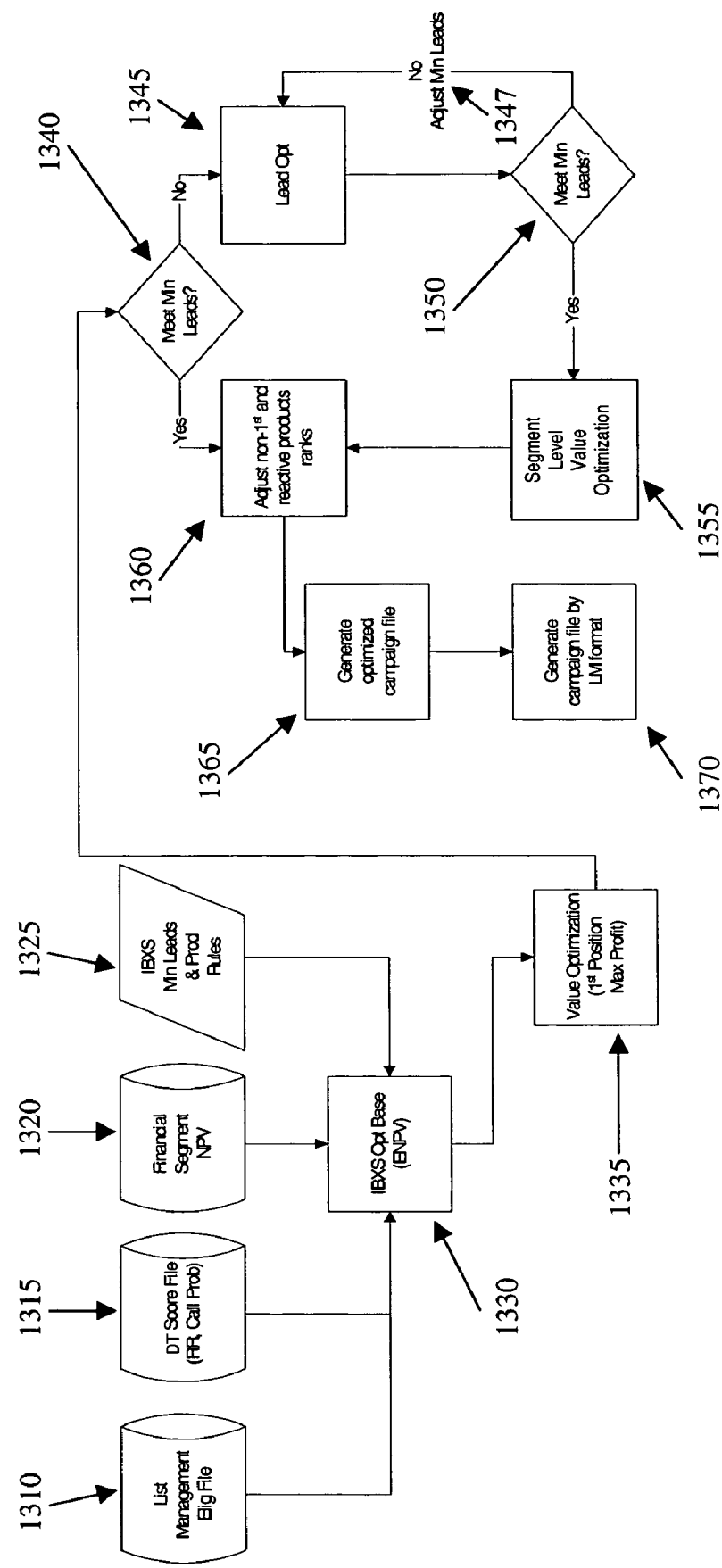
FIG. 13 is a flow chart depicting, according to an embodiment of the present invention, generating a routing strategy specific to a call-in customer.

FIG. 13 is a detailed flow chart depicting strategic decisioning generation of call routing strategies. Periodically, by way of non-limiting example, monthly, the strategic decisioning logic computes call-routing strategies for all customers and all offers. The process commences by computing an expected value. For purposes of illustration and by way of non-limiting example, for the remainder of the description of FIG. 13 the expected value is assumed to be an ENPV. Inbound cross-sell (IBXS) optimization logic 1330 computes an ENPV for each offer and customer pair based on customer eligibility, model scores, and net present value, as discussed above in reference to FIG. 12. These inputs are stored in and retrieved from databases 1310, 1315, and 1320, respectively. List management eligibility file 1310 stores offer eligibility flags in conjunction with relevant account and behavioral data associated with each customer. Decision Technologies (DT) score file database 1315 stores response rates and call probabilities of each customer. Financial segment NPV database 1320 stores a NPV associated with each offer. Each database 1310, 1315, and 1320 is operatively coupled to IBXS optimization logic 1330, which computes an ENPV for each product based on information retrieved from these databases. The ENPV is forwarded, along with constraints stored in constraint file 1325, to value optimization logic 1335.

Constraint file 1325 stores IBXS minimum leads requirements and product rules. The minimum leads requirements are generally developed monthly by marketing personnel and generally express the preferred number of calls that are exposed to each particular offer during that month. Alternately, the minimum leads requirements may express the preferred number of accounts or customers that are exposed to each offer each month. By way of non-limiting example, a minimum leads requirement may specify that an offer for privacy protection be presented to 100,000 callers that month. Constraints file 1325 also stores product rules. Product rules include, by way of non-limiting example, whether an offer may be accepted twice, any waiting period associated with the offer, partner-defined restrictions on the offer, and other offer restrictions. Product rules may also include constraints on how the offers are to appear in the call routing strategy. By way of non-limiting example, a balance transfer offer may be specified as always appearing after other proactive offers (see below) in the call-routing strategy for marketing reasons. Other product rules may also be stored in constraints file 1325.

Value optimization logic 1335 receives ENPV and constraints-file data and assigns first-position offers to customers so as to maximize the total ENPV for the channel across all the available offers. To maximize the total ENPV, optimization logic 1335 first finds the maximum ENPV among all products for each account, then selects first-position offers by descending maximum ENPV order based on the minimum leads requirements or other business rules. Other approaches to prioritizing offers may also be used (e.g., based upon revenue, responses, cost, loss, call volume, or gross profits). For each customer, value optimization logic 1335 preferably forms a routing list of the ten offers with highest ENPV for that customer. Value optimization logic 1335 then forwards the routing lists, one for each customer, to minimum leads decision logic 1340.

Minimum leads decision logic 1340 checks whether the lists formed by value optimization logic 1335 meet the minimum leads requirements. To accomplish this task, for each offer, decision logic 1340 identifies all routing lists in which that particular offer appears in the first position. Decision logic 1340 next identifies each customer associated with these identified routing lists. Decision logic 1340 then sums the call probabilities associated with each of these customers. If this sum meets or exceeds the minimum leads requirement, then the minimum leads requirement is met and the process branches to adjustment logic 1360. If the sum is less than the minimum leads requirement for that offer, then the minimum lead requirement is not met. In that case, decision logic 1340 passes control to lead optimization logic 1345. In sum, for each minimum lead requirement associated with each offer, minimum leads decision logic 1340 checks whether the sum of the call probabilities associated with routing lists in which that particular offer appears first exceeds the minimum lead requirement.

If the minimum leads requirements are not met, then control passes to lead optimization logic 1345. Lead optimization logic 1345 first breaks up the entire portfolio into eligibility segments. For each segment, lead optimization logic 1345 applies an integer program to maximize, by way of non-limiting example:

$$\text{Max} \sum_{1 \le i \le I, 1 \le j \le J} E_{ij} \cdot V_{ij} \cdot X_{ij}. \quad (1)$$

In formula (1), the parameter 1 is the number of eligibility segments and J is the number of offers. The parameter $E_{ij}$ is the eligibility flag for segment i and offer j, $V_{ij}$ is the average ENPV per customer in segment i with offer j in first position, and $X_{ij}$ is a decision variable indicating the number of customers in segment i with offer j in the first position. Formula (1) is optimized subject to the following exemplary constraints:

$$\sum_{1 \le j \le J} E_{ij} \cdot X_{ij} \le F_i, \quad (2)$$

$$\sum_{1 \le i \le I} E_{ij} \cdot C_i \cdot X_{ij} = L_j. \quad (3)$$

The parameters in formulas (2) and (3) are identical to those in formula (1) with the following additions. The parameter $F_i$ is the number of accounts in segment i, $C_i$ is the average call probability of customers in segment i, and $L_j$ is the minimum lead requirement for offer j. Formula (2) ensures that at most $F_i$ customers are assigned to first position for each segment i. Formula (3) ensures that the minimum lead requirements are met for each offer j. Software packages capable of optimizing formula (1) subject to formulas (2) and (3) by way of integer programming include CPLEX available from ILOG and a MICROSOFT EXCEL optimization add-in package SOLVER by MICROSOFT. Linear or mixed integer programming may also be used. Alternately, lead optimization logic 1345 may use other techniques for optimizing leads. After optimizing according to formulas (1)-(3), lead optimization logic 1345 passes control and forwards the solution, if it exists, to leads decision logic 1350.

Minimum leads decision logic 1350 checks whether lead optimization logic 1345 determined a solution was possible. If no solution exists, i.e., if no rearrangement satisfying all offer minimum leads requirements is possible, then control branches to minimum leads adjustment alert 1347, which informs marketing personnel that it is impossible to meet the current minimum leads requirements. The strategic decisioning process pauses while marketing personnel revise the minimum leads requirements stored in constraints file 1325. Upon minimum leads requirements revision, marketing personnel reinitiate the process, and control passes back to lead optimization logic 1345. Once minimum leads decision logic 1350 determines that a solution is possible, control passes to segment-level value optimization logic 1355.

Segment level value optimization logic 1355 receives the solution developed by lead optimization logic 1345 and optimizes routing lists with respect to minimum leads requirements. Specifically, at this stage there are enough eligible accounts for each segment to ensure that all minimum leads requirements in the first position are met. Segment level value optimization logic rearranges enough eligible accounts in the segment to ensure that the maximum total ENPV for that segment is achieved.

At this point in the strategic decisioning process of FIG. 13, offers appearing in the routing lists may be categorized as either "proactive" or "reactive." Proactive offers are those offers that are prioritized for presentation to customer callers. These offers are designed to satisfy the minimum leads requirements for first positions. Thus, for example, proactive offers appear first in routing lists that have been rearranged by segment level value optimization logic 1355 to include a particular offer in the first position so as to satisfy a minimum leads requirement for that offer. Moreover, if a customer whose associated routing list includes a proactive offer calls into the system, the customer will be routed to a presentation on that offer at some point during the call. This helps to ensure that the number of offers actually presented to customers agrees with the minimum leads requirement for that offer for that month.

Reactive offers are those offers that appear in a routing list to which customer callers will not necessarily be routed to hear associated presentations. Reactive offers include those offers appearing in the first position of routing lists that were eligible to be rearranged by segment level value optimization logic 1355 but were not, because enough routing lists had already been rearranged to ensure that the minimum leads requirements were met. A customer service representative or other system administrator may route a customer call to hear a presentation on a reactive offer, but such routing is not given the priority that proactive offers are afforded. Thus, a customer having a reactive offer in the first position of the customer's associated routing list will not generally be routed to hear any presentation should that customer call into the system. Likewise, a customer having a proactive offer in the first position of that customer's routing list will generally be routed to hear a presentation on that offer.

For routing lists with proactive offers in the first position, reactive adjustment logic 1360 orders the remaining eligible proactive offers according to ENPV from highest to lowest. For routing lists without a proactive offer in the first position after segment level value optimization logic 1355, reactive offer adjustment logic 1360 orders the reactive offers in each routing list according to offer rules in constraints file 1325. Thus, should a customer service representative choose to route a customer to a reactive offer presentation, the customer service representative is assured that the higher a reactive offer in the list, the more appropriate the offer will be for that customer and for the offeror.

Campaign file optimization logic 1365 generates a file containing customer information, flags identifying offers, and offer ordering in the respective routing list.

List management campaign file generation logic 1370 converts the campaign files generated by campaign file optimization logic 1365 into a standardized format that is recognized by a list management server coupled to the call routing system.

Call-handling resources are considered when actually implementing a campaign file during a customer call. In particular, if a queue for a customer's highest priority offer is temporarily at full capacity, the customer may be routed to the next highest-priority offer. Special queues may also be used. For example, a queue staffed by top-rated personnel may be dedicated to the highest-priority customers. In that manner, customers with the highest profitability potential are handled by expert staff. Other possibilities include using highly-capable personnel to staff queues with high throughput requirements.

Figure 14:
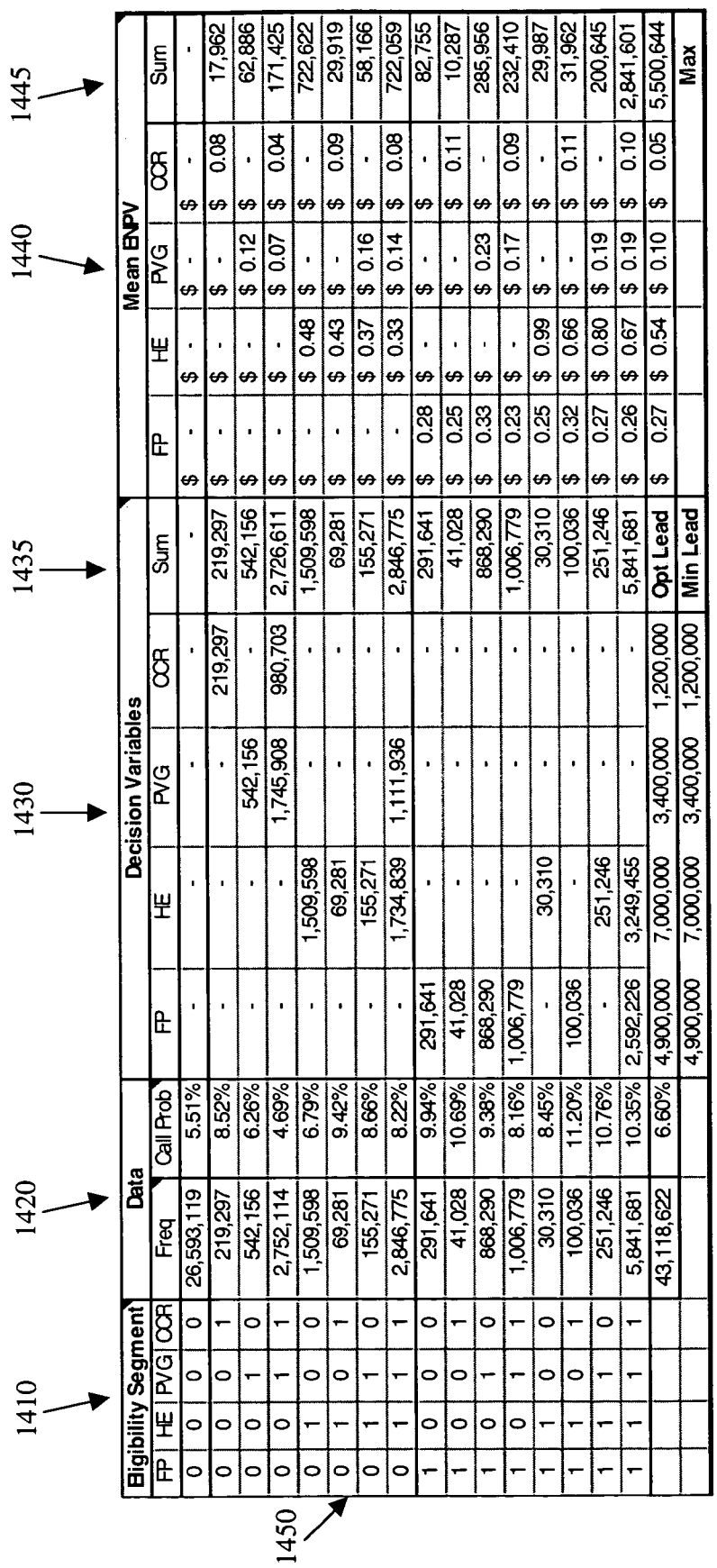
FIG. 14 is a chart depicting lead optimization results according to an embodiment of the present invention.

FIG. 14 is a chart 1400 depicting lead optimization results according to an embodiment of the present invention. The quantities depicted in FIG. 14 are typical and representative of finance data but do not represent actual Bank One customer data. The first four columns 1410 contain eligibility flags for all possible eligibility segments that may be formed by four offers. The four offers are: FIRST PROTECT (FP), HELOC TRANSFERS (HE), PRIVACY GUARD (PVG) and CREDIT CARD REGISTRY (CCR). Thus, there are sixteen rows, one for each eligibility segment. The second two columns 1420 depict the empirically-derived frequency of customer calls and corresponding average call probability among customers in each eligibility segment. The next four columns 1430 depict the number of first-position proactive offers for each particular offer grouped according to eligibility segment. These columns reflect the results of lead optimization (e.g., by lead optimization logic 1345 and subsequent processing). A numeric entry in a cell indicates the number of first-position proactive offers selected from among the offer of the corresponding column and the eligibility segment of the corresponding row. Because chart 1400 illustrates results after lead optimization, the sum of the entries in each offer column equals (or exceeds) the minimum leads requirement for that offer. After summation column 1435 reflecting the total number of proactive offers in each eligibility segment, the next four columns 1440 depict the empirically-derived mean ENPV corresponding to each entry in columns 1430. Thus, columns 1440 allow for estimating the expected net present value that may be earned that month. The last column 1445 records the sum from column 1435 multiplied by the entries of columns 1440. Thus, sum column 1445 includes the total expected net present value for that month for each of the eligibility segments.

By way of example, the entries in the sixth row 1450 of chart 1400 may be interpreted as follows. In the first four columns 1410, zeros (0) appear under the offers FP and PVG and ones (1) appear under the offers HE and CCR. Thus, the sixth row 1450 corresponds to the eligibility segment of customers that are eligible for HELOC TRANSFERS and CREDIT CARD REGISTRY and ineligible for FIRST PROTECT and PRIVACY GUARD. Columns 1420 of sixth row 1450 indicate that there are 69,281 customers in this segment and that the average call probability for these customers is 9.42%. Columns 1430 contain one entry in sixth row 1450, namely 69,281 under HE. Thus, after lead optimization, every customer in the eligibility segment of the sixth row 1450 has HELOC TRANSFERS as the customer's associated first position proactive offer. Even though customers in this eligibility segment are eligible for CREDIT CARD REGISTRY, none have this offer as a proactive offer due to optimization techniques. Because 69,281 customers with an ENPV of $0.43 have HELOC TRANSFERS as their proactive offer, column 1445 indicates that an expected profit from this population is $29,919.

FIG. 15 is a chart 1500 depicting routing list formation for a number of call-in customers according to an embodiment of the present invention. The quantities depicted in FIG. 15 are typical and representative of finance data but do not represent actual Bank One customer data. Column 1510 contains account numbers of customers whose routing list formation is illustrated. Columns 1515 correspond to three offers: FIRST PROTECT (FP), HELOC TRANSFERS (HE), PRIVACY GUARD (PVG). The corresponding eligibility segment for each account and these three offers appears in columns 1515.

Column 1520 contains customer behavioral segments. Customer behavioral segments are a classification scheme for grouping accounts based on card usage, risk and value (i.e., profit) for the purpose of selecting and targeting accounts for portfolio management program initiatives and offers in general. The code BLEND indicates that the customer account is used as both a payment vehicle and for borrowing. The code EMOB indicates that the customer set up the account less than one year from the present date. Other codes that may be assigned include: INACTIVE indicating that the account has no balance and that there have been no transactions or interest over the past twelve months), LEND (indicating that the account is used predominantly as a borrowing vehicle), SPEND (indicating that the account is used primarily as a payment vehicle), and OTHER (indicating that the account has an anomaly such as missing a risk index or NPV).

Column 1525 includes the estimated call probabilities for each customer, and columns 1530 include the estimated response rates of each customer for each offer. Column 1535 includes the NPV for each offer, and columns 1540 weight the NPVs by the eligibility flags, response rates, and call probabilities, yielding ENPVs for each offer. Finally, column 1545 depicts the ranking of each offer according to ENPV.

By way of example, the first row 1550 in chart 1500 is directed to account number 5046. Columns 1515 include a one (1) for FP and PVG and a zero (0) for HE. Thus, account number 5046 is eligible for FIRST PROTECT and PRIVACY GUARD and ineligible for HELOC TRANSFERS. Column 1520 of first row 1550 includes the code BLEND, which indicated that the accountholder uses the account both as a payment vehicle and for borrowing. The probability that the customer associated with account number 5046 will call that month is estimated at 34.32%, given in column 1520. The customer response rates appear in columns 1530. Thus, the customer associated with row 1550 has a 4.37% estimated probability of accepting FIRST PROTECT, a 8.17% estimated probability of accepting HELOC TRANSFERS, and 23.85% estimated probability of accepting PRIVACY GUARD. The NPVs for account 5046 are given in columns 1535. For the customer whose data are recorded in row 1550, FIRST PROTECT has an NPV of $105.83, HELOC TRANSFERS has an NPV of $51.18, and PRIVACY GUARD has an NPV of $26.76. Columns 1540 weight the NPVs of columns 1535 by the eligibility flags, response rates, and call probabilities, yielding ENPVs for each offer. In particular, FIRST PROTECT has an ENPV of $1.586, HELOC TRANSFERS has an ENPV of $0.000, and PRIVACY GUARD has an ENPV of $2.190. Note that HELOC TRANSFERS' ENPV of $0.000 is a result of the customer being ineligible for that offer. Columns 1545 for row 1550 indicate that FIRST PROTECT is ranked first, PRIVACY GUARD is ranked second, and HELOC TRANSFERS is not ranked, as the customer is ineligible for that offer.

As referred to herein, offers may be for products, services, or any combination thereof. Any reference to an offered "product" should be interpreted to mean product, service, or a combination thereof.

According to embodiments of the present invention, routing strategies may be formed by various methods. Optimization techniques are not limited to linear or integer programming. Routing strategies may be formed real-time when each customer calls. Alternately, routing strategies may be partially pre-formed, and finalized for each particular customer upon that customer calling in. For periodic offer formation, the formation period may be continuously, daily, weekly, monthly, or any other period.

In embodiments of the present invention, the ranking and optimization techniques presented herein may be used in the context of a web site visitor. In such embodiments, offers are presented to a customer whose contact with the system is by way of a web site. By way of non-limiting example, a customer may log in to a customer service site to manage his or her account. The customer might be seeking information or intending to change account parameters. Once the customer is identified by supplying information to the web site, through using cookies, or by other technique, that customer's offer list is retrieved by the system. The offer list is formed in essentially the same way as a call-routing list as disclosed herein. The offer list contains offers prioritized for presentation to the customer through the web site or otherwise. Offer presentations or advertisements may be presented to the customer viewing the web site by way of pop-up windows, may be presented in the same web browser window in which the customer is accessing his or her account, or may be by way of some other web-based presentation technique. One or more offer presentations or advertisements may be delivered to the customer at any time before, during, or after the customer's purpose for visiting the web site has been satisfied. The offer presentations or advertisements may be automatically presented or may be manually controlled by a system administrator.

Moreover, embodiments of the present invention may be at once both telephonic-based and web-based. For example, resting periods may be imposed after either or both of an offer presented telephonically or an offer presented via the internet. For resting periods triggered by multiple prior presentations, the system may take into account both web and telephonic presentations. In such unified systems, the offer list and call-routing list may be the same list, or may differ in order to account for differences between systems. Further, in such unified systems, the offer presentations may be web-based, telephonic, or both. By way of non-limiting example, a call-in customer may receive offer presentations over the internet (e.g., via email or on the system web site the next time the customer visits), or a customer visiting a web page may receive an offer presented telephonically (possibly at the same time that the user is visiting the web site).

Real-time communications in embodiments of the present invention are not limited to telephonic calls. More particularly, routing real-time customer interactions in embodiments of the present invention is not limited to routing telephonic calls. By way of non-limiting example, the techniques disclosed herein may be used to route voice-over-IP communications. Alternately, or in addition, the techniques disclosed herein may be used to route or otherwise direct real-time text interactions. Such real-time text interactions may be, by way of non-limiting example, an internet chat forum, a real-time customer service messaging forum, or text messaging, cellular-telephone phone based or otherwise.

According to embodiments of the present invention, the techniques described herein are not limited to incoming customer calls. In particular, the call routing techniques based on account level data, call-handling resources, and/or customer data disclosed herein may be used to select one or more offer presentations targeted at customers reached by outgoing telephone calls or direct marketing.

In embodiments of the present invention, call return from IVR to IXT may be accomplished by Transfer Connect technology supported by AT&T Corporation.

Other embodiments and uses of this invention will be apparent to those having ordinary skill in the art upon consideration of the specification and practice of the invention disclosed herein. The specification and examples given should be considered exemplary only, and it is contemplated that the appended claims will cover any other such embodiments or modifications as fall within the true scope of the invention.

What is claimed is:

1. A method of routing incoming customer telephony calls to presentations relating to products or services predicted to be of interest to the customer, the method comprising:
   forming a call routing strategy for a customer, in anticipation of at least one incoming call from the customer, by performing the following steps:
   accessing information relating to one or more products or services;
   retrieving customer specific information associated with that customer or an account of that customer;
   deciding, for each offer associated with the one or more products or services, and based on one or both of a call probability derived in part from the customer specific information and an offer eligibility derived in part from the customer specific information, whether the customer call may be routed to a cross-sell presentation relating to said each offer associated with the one or more products or services;

forming the call routing strategy for the customer consistent with said deciding; and storing the call routing strategy in association with a central server system;

receiving information of a call at the central server system;

generating a first routing control signal to route the call to an interactive voice response unit shared by a plurality of call sites, wherein the interactive voice response unit is external to an exchange carrier providing the call;

receiving input from a caller at the interactive voice response unit, the input at least identifying the caller as the customer for whom the call routing strategy has been pre-formed; and generating a second routing control signal for routing the call to one of said plurality of call sites based at least in part on the pre-formed call routing strategy associated with that customer.

2. The method of claim 1 wherein said deciding comprises checking the customer specific information for an indication as to whether the customer has previously been exposed to information relating to the one or more products or services.

3. The method of claim 1 wherein said deciding comprises deciding whether the customer is eligible to purchase the one or more products or services.

4. The method of claim 1 further comprising presenting a call routing strategy to a customer service representative.

5. The method of claim 1 further comprising ranking the products for which said deciding is in the affirmative according to a probable value of each product.

6. The method of claim 5 wherein the probable value of each product is calculated according to an estimated likelihood that the customer will purchase the product, the estimated likelihood being at least partially derived from the customer specific information.

7. The method of claim 1 further comprising automatically retrieving pre-stored customer specific information.

8. A method of routing incoming customer telephony calls to presentations relating to products or services predicted to be of interest to the customer, the method comprising:

receiving information of a call at a central server system;

generating a first routing control signal to route the call to an interactive voice response unit shared by a plurality of call sites, wherein the interactive voice response unit is external to an exchange carrier providing the call;

receiving input from a caller at the interactive voice response unit;

retrieving customer specific information based at least in part on the input received from the customer, wherein customer specific information is associated with the customer or an account of the customer;

accessing information relating to a product or service;

determining, based in part on the information relating to the product or service and in part on a probability derived from the customer specific information, whether the product or service is appropriate for the customer;

deciding, consistent with said determining, whether the customer call is to be routed to a presentation relating to the product or service; and generating a second routing control signal for routing the call to one of said plurality of call sites based at least in part on said deciding.

9. The method of claim 8 further comprising automatically retrieving pre-stored customer specific information.

10. The method of claim 8 further comprising routing the call by a customer service representative.

11. The method of claim 8 wherein said determining comprises at least one of determining whether the customer has previously been exposed to information relating to the product or service and determining whether the customer is eligible to purchase the product or service.

12. A system for routing incoming customer telephony calls to presentations relating to products or services predicted to be of interest to the customer, the system comprising:

a first computer operatively coupled to a telephony network capable of receiving customer calls, the first computer being configured to receive information regarding a call and to develop a routing control signal, wherein the telephony network is responsive to said routing control signal;

a plurality of call sites for receiving the call based on the routing control signal;

a voice response unit that is external to the telephony network and that is shared by the plurality of call sites, wherein the first computer pre-routes the call to the voice response unit in order to collect at least a portion of the information regarding the call in order to develop the routing control signal;

a first database containing customer specific information, wherein the customer specific information is associated with each customer or an account of each customer;

a second database containing information relating to a plurality of products or services;

a second computer operatively coupled to said first computer, to said first database, and to said second database, said second computer configured to decide, for each of the plurality of products or services and based on one or both of a call probability derived in part from the customer specific information and an offer eligibility derived in part from the customer specific information, whether the customer call may be routed to a presentation relating to the product or service and to form a call routing strategy based on the results of the decision and on available call handling resources, said second computer being configured to communicate at least a portion of the routing strategy to the first computer; and the first computer being further configured to develop the routing control signal according to the call routing strategy formed by the second computer.

13. The system of claim 12 wherein said second computer is configured to check the customer specific information for an indication as to whether the customer has previously been exposed to information relating to a product or service.

14. The system of claim 12 wherein said second computer is configured to decide whether the customer is ineligible to purchase the product or service.

15. The system of claim 12 further comprising a customer service terminal operatively coupled to said second computer and configured to receive and communicate the routing strategy to a customer service representative.

16. The system of claim 12 wherein said second computer is configured to rank the products for which the decision is in the affirmative according to a probable value of each product.

17. The system of claim 16 wherein the second computer is configured to calculate the probable value of each product according to an estimated likelihood, at least partially derived from the customer specific information, that the customer will purchase the product.

18. The system of claim 12 wherein said first computer is configured to locate customer specific information in the first database based on caller identification.

19. The system of claim 12 wherein the first computer and the second computer are portions of the same computer.

20. A system for routing incoming customer telephony calls to presentations relating to products or services predicted to be of interest to the customer, the system comprising:
   a first computer operatively coupled to a telephony network capable of receiving customer calls, the first computer being configured to receive information regarding a call and to develop a routing control signal, wherein the telephony network is responsive to said routing control signal;
   a plurality of call sites for receiving the call based on the routing control signal;
   a voice response unit that is external to the telephony network and that is shared by the plurality of call sites, wherein the first computer pre-routes the call to the voice response unit in order to collect at least a portion of the information regarding the call in order to develop the routing control signal;
   a first database containing customer specific information, wherein the customer specific information is associated with each customer or an account of each customer;
   a second database containing information relating to a product or service;
   a second computer operatively coupled to said first computer, to said first database, and to said second database, said second computer configured to determine, based at least in part on the information relating to the product or service and at least in part on a call probability derived from the customer specific information, whether the product or service is appropriate for the customer and to form a call routing strategy based thereupon and based on available call handling resources, said second computer being configured to communicate at least a portion of the routing strategy to the first computer; and
   the first computer being further configured to develop the routing control signal according to the call routing strategy formed by the second computer.

21. The system of claim 20 wherein said first computer is configured to locate customer specific information in the first database based on caller identification.

22. The system of claim 20 wherein the first computer and the second computer are portions of the same computer.

23. The system of claim 20 further comprising a customer service terminal operatively coupled to the first computer and the second computer and configured to present the routing strategy to a customer service representative.

24. A system for routing incoming customer telephony calls to presentations relating to products or services predicted to be of interest to the customer, the system comprising:
   means for forming a call routing strategy for a customer, in anticipation of at least one incoming call from the customer, said means for forming further comprising:
      means for accessing information relating to one or more products or services;
      means for retrieving customer specific information associated with that customer or an account of that customer;
      means for deciding, for each offer associated with the one or more products or services, and based on one or both of a call probability derived in part from the customer specific information and an offer eligibility derived in part from the customer specific information, whether the customer call may be routed to a cross-sell presentation relating to said each offer associated with the products or services;
      means for forming the call routing strategy for the customer consistent with said deciding; and
      means for storing the call routing strategy in association with a central server system;
   means for receiving information of a call at the central server system;
   means for generating a first routing control signal to route the call to an interactive voice response unit shared by a plurality of call sites, wherein the interactive voice response unit is external to an exchange carrier providing the call;
   means for receiving input from a caller at the interactive voice response unit, the input at least identifying the caller as the customer for whom the call routing strategy has been pre-formed; and
   means for generating a second routing control signal for routing the call to one of said plurality of call sites based at least in part on the pre-formed call routing strategy associated with the customer.

25. A method of routing incoming customer telephony calls to presentations relating to products or services predicted to be of interest to the customer, the method comprising:
   retrieving, for a plurality of customers, customer specific information, wherein the customer specific information for each customer comprises past purchase data, past offer data, and account data is associated with the customer;
   accessing information relating to one or more products or services;
   computing, for each product or service, an expected value as a product of a probability and a monetary amount, the monetary amount being based at least in part on a net present value of a sale of the product or service to a seller of the product or service;
   determining, for each product or service, an eligibility parameter, the eligibility parameter being based at least partially on the information relating to the product or service, the eligibility parameter being based at least partially on at least one of the past offer data and the account data;
   forming a routing strategy consistent with said computing and said determining, the routing strategy being formed in anticipation of customer calls and stored in a central server system;
   receiving information of a call at the central server system;
   generating a first routing control signal to route the call to an interactive voice response unit shared by a plurality of call sites, wherein the interactive voice response unit is external to an exchange carrier providing the call;
   receiving input from a caller at the interactive voice response unit, the input at least identifying the caller as a customer for whom the call routing strategy has been pre-formed; and
   generating a second routing control signal for routing the call to one of said plurality of call sites based at least in part on the pre-formed call routing strategy associated with the customer.

26. Instructions embodied in a computer readable medium capable of causing a computer to route incoming customer telephony calls to presentations relating to products or services predicted to be of interest to the customer, the instructions embodied in a computer readable medium configured to cause a computer to:

access information relating to one or more products or services;

retrieve, for a plurality of customers, customer specific information, wherein the customer specific information of each customer is associated with that customer or an account of that customer;

decide, for each of the one or more products or services, for each customer, and based on one or both of a probability derived in part from the customer specific information and an eligibility derived in part from the customer specific information, whether the customer call may be routed to a presentation relating to the product or service; and form a call routing strategy consistent with said deciding in anticipation of customer calls;

wherein the instructions embodied in a computer readable medium cause a central server system to route customer calls according to the pre-formed call routing strategy by:

receiving information of a call at the central server system;

generating a first routing control signal to route the call to an interactive voice response unit shared by a plurality of call sites, wherein the interactive voice response unit is external to an exchange carrier providing the call;

receiving input from a caller at the interactive voice response unit, the input at least identifying the caller as a customer for whom the call routing strategy has been pre-formed; and generating a second routing control signal for routing the call to one of said plurality of call sites based at least in part on the pre-formed call routing strategy associated with the customer.

27. A method of forming an offer presentation strategy for use with a customer initiated contact, the offer presentation strategy being constructed to contain offers predicted to be of interest to the individual customer who initiates contact, the method comprising:

accessing customer information of each of a plurality of customers, the customer information comprising at least one of account specific information of each of the plurality of customers and behavior information of each of the plurality of customers;

accessing information regarding a plurality of products or services;

forming a list of offers in anticipation of customer initiated contacts, the list of offers being specific to a customer, the list of offers being ordered based in part on information derived from the information of each of the plurality of customers, wherein the information includes one or more factors selected from a group consisting of: a probability of the customer initiating a contact, an eligibility of the customer for an offer, a response rate by the customer to an offer, and a net present value of an accepted offer;

receiving information of a call at a central server system;

generating a first routing control signal to route the call to an interactive voice response unit shared by a plurality of call sites, wherein the interactive voice response unit is external to an exchange carrier providing the call;

receiving input from a caller at the interactive voice response unit, the input at least identifying the caller as a customer for whom a list of offers has been pre-formed; and generating a second routing control signal for routing the call to one of said plurality of call sites so as to present an offer to the customer in accordance with the pre-formed list of offers specific to that customer.

* * * * *